(12) United States Patent
Verma et al.

(10) Patent No.: US 11,722,532 B2
(45) Date of Patent: *Aug. 8, 2023

(54) SECURITY FOR CELLULAR INTERNET OF THINGS IN MOBILE NETWORKS BASED ON SUBSCRIBER IDENTITY AND APPLICATION IDENTIFIER

(71) Applicant: Palo Alto Networks, Inc., Santa Clara, CA (US)

(72) Inventors: Sachin Verma, Danville, CA (US); Leonid Burakovsky, Pleasanton, CA (US); Jesse C. Shu, Palo Alto, CA (US); Lei Chang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,811

(22) Filed: Mar. 8, 2022

(65) Prior Publication Data

US 2022/0201046 A1    Jun. 23, 2022

Related U.S. Application Data

(63) Continuation of application No. 16/900,958, filed on Jun. 14, 2020, now Pat. No. 11,323,486, which is a
(Continued)

(51) Int. Cl.
*H04L 9/40* (2022.01)
*H04W 12/122* (2021.01)
(Continued)

(52) U.S. Cl.
CPC ........ *H04L 63/205* (2013.01); *H04L 63/0227* (2013.01); *H04L 63/0272* (2013.01);
(Continued)

(58) Field of Classification Search
CPC ....... H04W 12/088; H04W 8/22; H04W 8/18; H04W 12/122; H04L 67/12;
(Continued)

(56) References Cited

U.S. PATENT DOCUMENTS 7,283,497 B2   10/2007   Mueller
7,447,765 B2   11/2008   Aerrabotu
(Continued)

FOREIGN PATENT DOCUMENTS

CA    2921309      4/2015
CN    101335630    12/2008
(Continued)

OTHER PUBLICATIONS

3GPP, 3GPP TS 23.003, V15.2.0, 3rd Generation Partnership Project; Technical Specification Group Core Network and Terminals; Numbering Addressing and Identification (Release 15), p. 1-116, Dec. 2017.
(Continued)

*Primary Examiner* — Bryan F Wright
(74) *Attorney, Agent, or Firm* — Van Pelt, Yi & James LLP

(57) ABSTRACT

Techniques for providing security for Cellular Internet of Things (CIoT) in mobile networks (e.g., service provider networks for mobile subscribers) are disclosed. In some embodiments, a system/process/computer program product for enhanced security for CIoT in mobile networks in accordance with some embodiments includes monitoring network traffic on a service provider network at a security platform to identify a subscriber identity for a new session,
(Continued)

in which the session is associated with a CIoT device; determining an application identifier for user traffic associated with the new session at the security platform; and determining a security policy to apply at the security platform to the new session based on the subscriber identity and the application identifier.

20 Claims, 9 Drawing Sheets

Related U.S. Application Data continuation of application No. 16/020,056, filed on Jun. 27, 2018, now Pat. No. 10,812,532, which is a continuation-in-part of application No. 15/624,437, filed on Jun. 15, 2017, now Pat. No. 10,721,272, and a continuation-in-part of application No. 15/624,440, filed on Jun. 15, 2017, now Pat. No. 10,708,306.

(51) Int. Cl.
  *H04W 8/22* (2009.01)
  *H04W 8/18* (2009.01)
  *H04L 67/12* (2022.01)
  *H04W 12/088* (2021.01)

(52) U.S. Cl.
  CPC ....... *H04W 12/122* (2021.01); *H04L 63/0876* (2013.01); *H04L 67/12* (2013.01); *H04W 8/18* (2013.01); *H04W 8/22* (2013.01); *H04W 12/088* (2021.01)

(58) Field of Classification Search
  CPC ............. H04L 63/0876; H04L 63/0272; H04L 63/0227; H04L 63/205
  USPC ......................................................... 726/14
  See application file for complete search history.

(56) References Cited

U.S. PATENT DOCUMENTS

| | | |
|---|---|---|
| 7,474,894 B2 | 1/2009 | Cardina |
| 7,865,944 B1 | 1/2011 | Shu |
| 8,458,786 B1 | 6/2013 | Kailash |
| 8,464,320 B2 | 6/2013 | Archer |
| 8,612,612 B1 | 12/2013 | Dukes |
| 8,626,164 B2 | 1/2014 | Barkley |
| 8,726,343 B1 | 5/2014 | Borzycki |
| 8,880,007 B1 | 11/2014 | Mansour |
| 8,990,893 B2 | 3/2015 | Greenlee |
| 9,081,746 B1 | 7/2015 | Helter |
| 9,131,419 B2 | 9/2015 | Granzow |
| 9,219,751 B1 | 12/2015 | Chen |
| 9,325,735 B1 | 4/2016 | Xie |
| 9,699,261 B2 | 7/2017 | Sade |
| 9,743,269 B1 | 8/2017 | Yadav |
| 9,800,560 B1 | 10/2017 | Guo |
| 10,075,827 B1 | 9/2018 | Kodaypak |
| 10,097,546 B2 | 10/2018 | Hao |
| 10,129,730 B2 | 11/2018 | Itagaki |
| 10,142,290 B1 | 11/2018 | Brandwine |
| 11,349,854 B1 | 5/2022 | Moore |
| 2002/0156917 A1 | 10/2002 | Nye |
| 2004/0064351 A1 | 4/2004 | Mikurak |
| 2004/0123150 A1 | 6/2004 | Wright |
| 2004/0199914 A1 | 10/2004 | Aerrabotu |
| 2004/0268124 A1* | 12/2004 | Narayanan ............ H04L 63/102 713/164 |
| 2005/0188221 A1 | 8/2005 | Motsinger |
| 2005/0202828 A1 | 9/2005 | Pecen |
| 2006/0034198 A1 | 2/2006 | Makinen |
| 2006/0156380 A1 | 7/2006 | Gladstone |
| 2006/0174001 A1 | 8/2006 | Zhu |
| 2006/0236370 A1 | 10/2006 | John |
| 2006/0262736 A1 | 11/2006 | Dong |
| 2006/0271693 A1 | 11/2006 | Thiebaut |
| 2007/0276957 A1 | 11/2007 | King |
| 2008/0167035 A1 | 7/2008 | Buckley |
| 2009/0016245 A1 | 1/2009 | Karls |
| 2009/0088147 A1 | 4/2009 | Bu |
| 2009/0270097 A1 | 10/2009 | Gallagher |
| 2010/0063960 A1 | 3/2010 | Lehto |
| 2010/0064133 A1 | 3/2010 | Martin |
| 2010/0211996 A1 | 8/2010 | McGeehan |
| 2011/0002339 A1 | 1/2011 | Fok |
| 2011/0045675 A1 | 2/2011 | Miya |
| 2011/0107413 A1 | 5/2011 | Chawla |
| 2011/0116382 A1 | 5/2011 | Mccann |
| 2011/0305138 A1 | 12/2011 | Huomo |
| 2012/0054847 A1 | 3/2012 | Schultz |
| 2012/0076120 A1 | 3/2012 | Kovvali |
| 2012/0167162 A1 | 6/2012 | Raleigh |
| 2012/0207063 A1 | 8/2012 | Shaw |
| 2012/0275348 A1 | 11/2012 | Zhou |
| 2013/0080774 A1 | 3/2013 | Combet |
| 2013/0086631 A1 | 4/2013 | Archer |
| 2013/0111542 A1 | 5/2013 | Shieh |
| 2013/0166746 A1 | 6/2013 | Andreasen |
| 2013/0227284 A1 | 8/2013 | Pfeffer |
| 2014/0044019 A1 | 2/2014 | Anthony, Jr. |
| 2014/0064180 A1 | 3/2014 | Kotecha |
| 2014/0157352 A1 | 6/2014 | Paek |
| 2014/0189861 A1 | 7/2014 | Gupta |
| 2014/0244994 A1 | 8/2014 | Yu |
| 2014/0247731 A1 | 9/2014 | Nagaraj |
| 2014/0293824 A1 | 10/2014 | Castro Castro |
| 2014/0304766 A1 | 10/2014 | Livne |
| 2014/0321278 A1 | 10/2014 | Cafarelli |
| 2014/0337743 A1 | 11/2014 | Branton |
| 2014/0369188 A1 | 12/2014 | Seleznyov |
| 2015/0043438 A1 | 2/2015 | Fwu |
| 2015/0181462 A1 | 6/2015 | Iwai |
| 2015/0181592 A1 | 6/2015 | Bindrim |
| 2015/0215186 A1 | 7/2015 | Alonso Franco |
| 2015/0236914 A1 | 8/2015 | Woods |
| 2015/0256975 A1 | 9/2015 | Wilson |
| 2015/0288679 A1 | 10/2015 | Ben-Nun |
| 2015/0288828 A1 | 10/2015 | Lim |
| 2015/0319185 A1 | 11/2015 | Kirti |
| 2016/0036862 A1 | 2/2016 | Bagepalli |
| 2016/0119842 A1 | 4/2016 | Zhang |
| 2016/0135219 A1 | 5/2016 | Jain |
| 2016/0180093 A1 | 6/2016 | Goss |
| 2016/0182565 A1 | 6/2016 | Salvador |
| 2016/0205128 A1 | 7/2016 | Holtmanns |
| 2016/0278147 A1 | 9/2016 | Adrangi |
| 2016/0330748 A1 | 11/2016 | Bindrim |
| 2017/0034775 A1 | 2/2017 | Mandanapu |
| 2017/0048739 A1 | 2/2017 | Jeong |
| 2017/0055145 A1 | 2/2017 | Kannan |
| 2017/0134957 A1 | 5/2017 | Gupta |
| 2017/0163685 A1 | 6/2017 | Schwartz |
| 2017/0181037 A1 | 6/2017 | Zaghloul |
| 2017/0201533 A1 | 7/2017 | Targali |
| 2017/0230832 A1 | 8/2017 | Ophir |
| 2017/0366679 A1 | 12/2017 | Mohamed |
| 2017/0374695 A1 | 12/2017 | Lau |
| 2018/0006954 A1 | 1/2018 | Arora |
| 2018/0249528 A1 | 8/2018 | Kuge |
| 2018/0295138 A1 | 10/2018 | Harris |
| 2018/0302877 A1 | 10/2018 | Bosch |
| 2018/0324652 A1 | 11/2018 | Ryu |
| 2018/0324761 A1 | 11/2018 | Velev |
| 2018/0332554 A1 | 11/2018 | Kawasaki |
| 2018/0332650 A1 | 11/2018 | Kawasaki |
| 2018/0359255 A1 | 12/2018 | Stair |
| 2018/0359791 A1 | 12/2018 | Kawasaki |
| 2018/0367578 A1 | 12/2018 | Verma |
| 2018/0375900 A1 | 12/2018 | Verma |
| 2019/0014464 A1 | 1/2019 | Kuge |
| 2019/0021122 A1 | 1/2019 | Kawasaki |

(56) References Cited

U.S. PATENT DOCUMENTS

| | | |
|---|---|---|
| 2019/0028878 A1 | 1/2019 | Kawasaki |
| 2019/0028926 A1 | 1/2019 | Kawasaki |
| 2019/0028933 A1 | 1/2019 | Kawasaki |
| 2019/0090122 A1 | 3/2019 | Palnati |
| 2019/0110241 A1 | 4/2019 | Jain |
| 2019/0174387 A1 | 6/2019 | Kawasaki |
| 2019/0207986 A1 | 7/2019 | Mrowiec |
| 2019/0222521 A1 | 7/2019 | Flinck |

FOREIGN PATENT DOCUMENTS

| | | |
|---|---|---|
| CN | 101444119 | 5/2009 |
| CN | 101808307 | 8/2010 |
| CN | 102511175 | 6/2012 |
| CN | 105103648 | 11/2015 |
| CN | 105637834 | 6/2016 |
| CN | 107079287 | 8/2017 |
| CN | 104685957 | 6/2019 |
| CN | 105933279 | 12/2019 |
| DE | 60030697 | 1/2007 |
| EP | 1989898 | 11/2008 |
| EP | 3419339 | 12/2018 |
| EP | 3334239 | 2/2019 |
| EP | 3496439 | 6/2019 |
| HU | 230406 | 4/2016 |
| JP | 5937182 | 6/2016 |
| KR | 20090117443 | 11/2009 |
| WO | 2007101220 | 3/2008 |

OTHER PUBLICATIONS

Author Unknown, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11), 3rd Generation Partnership Project, Jun. 2014, pp. 1-231.

Author Unknown, 3rd Generation Partnership Project; Technical Specification Group Core Network and Terminals; General Packet Radio Service (GPRS); GPRS Tunnelling Protocol (GTP) Across the Gn and Gp Interface (Release 11), 3rd Generation Partnership Project, Sep. 2014, pp. 1-176.

ETSI, Technical Specification, ETSI TS 129 274, V13.5.0, Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3, (3GPP TS 29.274 version 13.5.0 Release 13) Apr. 2016.

ETSI, 5G; System Architecture for the 5G System, (3GPP TS 23.501 version 15.3.0 Release 15), ETSI TS 123 501, V15.3.0, Sep. 2018.

Gravina et al., Integration, Interconnection and Interoperability of IoT Systems, 2018.

Odinot et al., The Dutch Implementation of the Data Rentention Directive: On the Storage and Use of Telephone and Internet Traffic Data for Crime Investigation Purposes, 2014.

Ghribi et al., Understanding GPRS: The GSM Packet Radio Service, Computer Networks, vol. 34, 2000, pp. 763-779.

Ricciato et al., Traffic Monitoring and Analysis in 3G Networks: Lessons Learned from the METAWIN Project, Elektrotechnik & Informationstechnik, 2006, pp. 288-296.

* cited by examiner

SECURITY FOR CELLULAR INTERNET OF THINGS IN MOBILE NETWORKS BASED ON SUBSCRIBER IDENTITY AND APPLICATION IDENTIFIER

CROSS REFERENCE TO OTHER APPLICATIONS

This application is a continuation of U.S. patent application Ser. No. 16/900,958 entitled SECURITY FOR CELLULAR INTERNET OF THINGS IN MOBILE NETWORKS BASED ON SUBSCRIBER IDENTITY AND APPLICATION IDENTIFIER filed Jun. 14, 2020, which is a continuation of U.S. patent application Ser. No. 16/020,056, now U.S. Pat. No. 10,812,532, entitled SECURITY FOR CELLULAR INTERNET OF THINGS IN MOBILE NETWORKS filed Jun. 27, 2018, which is incorporated herein by reference for all purposes; which is a continuation in part of U.S. patent application Ser. No. 15/624,437, now U.S. Pat. No. 10,721,272, entitled MOBILE EQUIPMENT IDENTITY AND/OR IOT EQUIPMENT IDENTITY AND APPLICATION IDENTITY BASED SECURITY ENFORCEMENT IN SERVICE PROVIDER NETWORKS filed Jun. 15, 2017, which is incorporated herein by reference for all purposes; and U.S. patent application Ser. No. 15/624,440, now U.S. Pat. No. 10,708,306, entitled MOBILE USER IDENTITY AND/OR SIM-BASED IOT IDENTITY AND APPLICATION IDENTITY BASED SECURITY ENFORCEMENT IN SERVICE PROVIDER NETWORKS filed Jun. 15, 2017, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices). Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
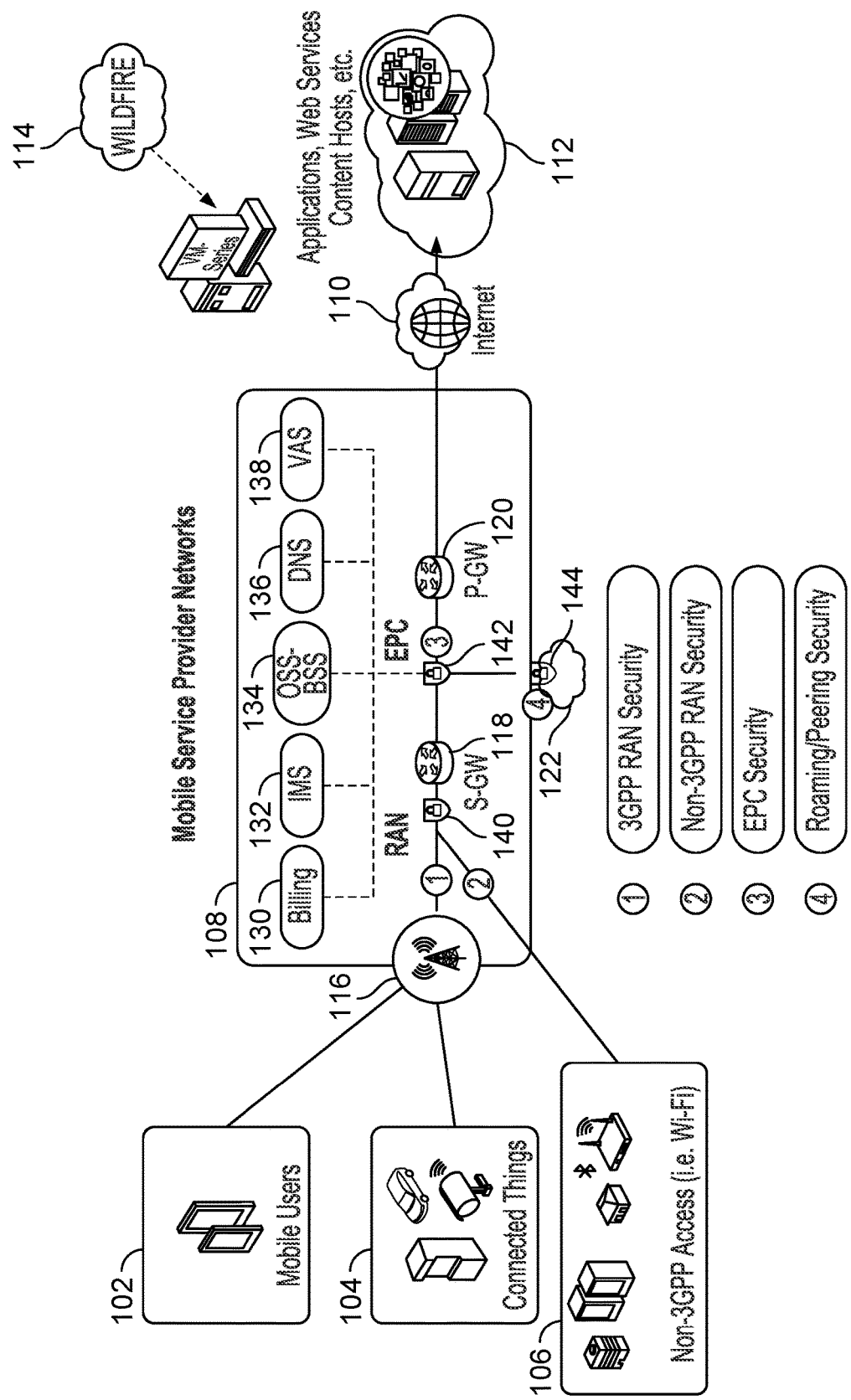
FIG. 1A is a block diagram of a 4G wireless network with a security platform for providing enhanced security for Cellular Internet of Things (CIoT) in mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID' (e.g., User ID) for user identification (e.g., by user or user group), and Content-ID' (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges in Today's Mobile Networks for Service Providers In today's service provider network environments, the service provider can typically only implement a static security policy for wireless devices communicating over the service provider's wireless network (e.g., the service provider cannot define a security/firewall policy on a per endpoint basis and/or a per flow basis for wireless devices communicating over the service provider's wireless network), and any changes generally require network infrastructure updates. Further, in today's service provider network environments, the service provider generally cannot implement a security policy that is for Cellular Internet of Things (CIoT) devices communicating over the service provider's wireless network (e.g., the service provider cannot implement the security policy based on various relevant parameters associated with CIoT devices, such as IMEI, IMSI, APP ID, source/destination or both IP/IPs for network traffic associated with a session for a CIoT device in mobile networks carried over S11-U tunnels, as further described herein).

Thus, technical and security challenges with service provider networks exist for CIoT devices in mobile networks. As such, what are needed are new and improved security techniques for CIoT devices in such service provider network environments (e.g., mobile networks). Specifically, what are needed are new and improved solutions for monitoring service provider network traffic and applying security policies (e.g., firewall policies) for CIoT devices communicating on service provider networks.

Overview of Techniques for Security for CIoT in Mobile Networks for Service Providers Accordingly, techniques for enhanced security platforms within service provider network environments are disclosed. Specifically, various system architectures for implementing and various processes for providing security platforms within service provider network environments that can monitor GPRS Tunneling Protocol (GTP) are disclosed. More specifically, various system architectures for implementing and various processes for providing security platforms within service provider network environments for enhanced security for CIoT in mobile networks for service providers that can monitor GTP including, for example, GTP over the S11-U 3GPP interface for user data within the Evolved Packet Core (EPC)/mobile core network and between the Radio Access Network (RAN) and the GPRS/mobile core network are disclosed.

In some embodiments, various techniques are disclosed for applying security for Cellular IoT (CIoT) in 4G and 5G networks transported over the S11-U 3GPP interface using a security platform (e.g., a firewall (FW)/Next Generation Firewall (NGFW), a network sensor acting on behalf of the firewall, or another device/component that can implement security policies using the disclosed techniques) by parsing GTP-C messages to extract S11-U related GTP context information as further described below.

In some embodiments, various techniques are disclosed for applying security for CIoT devices using 3GPP Low Power Wide Area (LPWA)/CIoT technologies as further described below. For example, in Narrow Band (NB) Radio Access Technology (RAT) for IoT in mobile networks, data traffic is transported over the S11-U 3GPP interface (e.g., S11-U interface) using a security platform (e.g., a firewall (FW)/NGFW, a network sensor acting on behalf of the firewall, or another device/component that can implement security policies using the disclosed techniques) by parsing GTP-C messages to extract S11-U related GTP context information. These and other examples will be further described below.

In one embodiment, a security platform is configured to monitor the GTP communications over the S11-U 3GPP interface (e.g., also referred to herein as the S11-U interface) within the mobile core network (e.g., next generation firewall, which can monitor a Create PDP Request and/or various other GTP-C messages exchanged for activation, updating, and/or deactivation of the GTP sessions in the service provider's network as further described below), and the security platform (e.g., a firewall (FW)/NGFW, a network sensor acting on behalf of the firewall, or another device/component that can implement security policies using the disclosed techniques) is configured to apply a security policy using one or more parameters extracted from the GTP-C messages as further described below. Thus, service providers, IoT/CIoT device providers, and/or system integrators can use the disclosed techniques to configure and enforce enhanced security policies using one or more parameters extracted from the GTP-C messages as further described below.

In one embodiment, the security platform is configured to monitor user session traffic in tunneling sessions in the mobile core/service provider's core network (e.g., GTP-C and/or GTP-U traffic) to perform Deep Packet Inspection (DPI) security monitoring techniques that can be utilized for applying security policies based on the user session traffic, as will be further described below.

In one embodiment, the security platform is configured to monitor the signaling messages (e.g., messages exchanged for activation, updating, and deactivation of GTP tunnels, such as GTP-C messages) to/from various network elements on the service provider network, such as the SGW and PGW (e.g., a Create PDP Request message and a Create PDP Response, an Update PDP Request and an Update PDP Response, and/or a Delete PDP Request and a Delete PDP Response) and is also configured to monitor user session traffic in tunneling sessions in the mobile core/service provider's core network (e.g., GTP-C and/or GTP-U traffic) to perform DPI security monitoring techniques that can be utilized for applying security policies based on information extracted from the signaling messages and/or user session traffic, as will be further described below.

In one embodiment, a subscriber/IP address is associated with (e.g., mapped to) a security policy to facilitate security policy enforcement per IP flow using the security platform (e.g., an NGFW). For example, the security platform can apply a granular security policy based on information extracted from the signaling messages and/or user session traffic, as will be further described below.

Generally, GPRS Tunneling Protocol (GTP) is a group of IP-based communication protocols used on various interfaces within GSM (Global System for Mobile Communication), UMTS (Universal Mobile Telecommunications System), and LTE (Long Term Evolution) networks. GTPv2-C is used in, for example, 4G/LTE networks and 5G networks.

Typically, a GTP session includes a control tunnel and a plurality of user tunnels for transporting GTP payloads. A GTP tunnel session in a firewall is a 5-tuple flow session plus tunnel IDs (TEID) with some additional mobile user related information, such as an application, IP address, content ID, subscriber location, unique device identifier (e.g., International Mobile Equipment Identifier (IMEI) for a generally unique 3GPP device identifier, such as for mobile phones for a Global System for Mobile Communications (GSM) network), unique subscriber identifier (e.g., International Mobile Subscriber Identity (IMSI) for uniquely identifying a GSM subscriber), Radio Access Technology (RAT) (e.g., for identifying the associated RAT for the mobile device), and/or any combination thereof using next generation firewalls on service provider networks, such as further described below. The GTP sessions can be manipulated during the process of GTP messages. For example, new tunnel sessions can be created upon receiving Create Session Request messages. These sessions are normally cleared later upon processing Delete Session Request messages.

In a mobile network prior to 3GPP Technical Specification (TS) 29 274 V13.5.0 Release 13, the S11 interface carried only GTP control information. From version 13.5.0 and later, the S11 interface can also carry user plane traffic for IoT devices via the S11-U interface (e.g., S11-U interface and tunnels are defined in 3GPP TS 29 274 V13.5.0 Release 13 available at http://www.etsi.org/deliver/etsi_ts/129200_129299/129274/13.05.00_60/ts_129274v130500p.pd f).

Accordingly, various enhanced security techniques for a security platform are disclosed for extracting S11-U related TEID information from GTP control messages during the tunnel creation procedure. For example, S11-U related TEID information can be extracted from a GTPv2-C Create Session Request/Response to set up GTP-U tunnel sessions in the security platform (e.g., NGFW). A GTPv2-C Modify Bearer Request/Response can be tracked for TEID's to update these GTP-U tunnel sessions. Finally, GTPv2-C Delete Session Request/Response messages can also be tracked for TEIDs to delete these GTP-U tunnel sessions. Also, GTP-U tunnel sessions in the security platform are not limited to S1; in other words, each user may use one GTP-C tunnel session at S11 to manage several GTP-U tunnel sessions at S11 in addition to several GTP-U tunnel sessions at S1.

In some embodiments, a system/process/computer program product for providing security for CIoT in mobile networks includes monitoring network traffic on a service provider network at a security platform to identify a subscriber identity for a new session, in which the session is associated with a CIoT device; determining an application identifier for user traffic associated with the new session at the security platform; and determining a security policy to apply at the security platform to the new session based on the subscriber identity and the application identifier.

For example, the disclosed techniques for security for CIoT in mobile networks can be applied to provide enhanced context related to the subscriber and device over the new S1 i-U interface.

As another example, the disclosed techniques for security for CIoT in mobile networks can be applied to provide an application identifier (e.g., APP ID, such as further described below) and control for CIoT traffic with IMSI and IMEI correlation.

As yet another example, the disclosed techniques for security for CIoT in mobile networks can be applied to provide threat detection and prevention for CIoT traffic with IMSI and IMEI correlation.

As a further example, the disclosed techniques for security for CIoT in mobile networks can be applied to provide URL filtering for CIoT traffic with IMSI and IMEI correlation.

For example, security policies for the security platform can be applied per APP-ID and source/destination or both IP/IPs to IoT traffic carried over S11-U tunnels in mobile and converged networks.

As another example, threat prevention for the security platform can be applied per APP-ID and source/destination or both IP/IPs to IoT traffic carried over S11-U tunnels in mobile and converged networks.

As yet another example, URL filtering for the security platform can be applied per APP-ID and source/destination or both IP/IPs to IoT traffic carried over S11-U tunnels in mobile and converged networks.

In an example implementation, the disclosed techniques can be used by mobile service providers to apply security to IoT devices that connect to their network using 3GPP LPWA/CIoT technologies and use the S11-U interface for Cellular IoT (CIoT) control plane optimization.

New Security Services that can be Provided Using the Disclosed Techniques Include One or More of the Following:

a. Firewall services for CIoT;
b. Threat detection services for known threats for CIoT;
c. Advanced threat detection services for unknown threats for CIoT;
d. Basic threat prevention services for known threats for CIoT;
e. Advanced threat prevention services for unknown threats for CIoT;
f. URL filtering services for CIoT;
g. Application DoS detection services for CIoT; and/or
h. Application DoS prevention services for CIoT.

These and other embodiments and examples for providing security for CIoT in mobile networks will now be further described.

Example System Architectures for Implementing Enhanced Security for CIoT in Mobile Networks for Service Providers CIoT generally refers to Internet of Things (IoT) using 3GPP technology. Optimization has been done in Control and User plan in evolved packet core (EPC) to allow the network to deliver small data not only in user plane, but also in control plane. Signaling procedures have been simplified for CIoT to avoid unnecessary signaling and energy (battery drain) in the case of IoT devices. As referenced above, 3GPP Technical Specification (TS) 29 274 V13.5.0 Release 13 specifies an uplink/downlink transmission scheme that constitutes a core part of NB-IoT as well as NB-IoT requirements and operations modes (e.g., Standalone mode, Guardband Mode, and In-band Mode). NB-IoT generally requires a cell capacity of 50,000 devices per cell and more than ten years of device battery life.

As similarly described above, the disclosed techniques apply security for Cellular IoT (CIoT) traffic in 4G and 5G networks transported over S11-U 3GPP interface with Next Generation Firewall (NGFW) by parsing GTP-C messages to extract S11-U related GTP context information like S11-U TEID to set up GTP tunnel sessions.

In some embodiments, a security platform (e.g., PANOS executing on an NGFW available from Palo Alto Networks, Inc. or another security platform/NFGW) is configured to provide the following DPI capabilities: GTPv2-C stateful inspection of S11-U tunnels; GTP-U content inspection of S11-U tunnels (e.g., to inspect content of inner IP session of S11 GTP-U tunnels); and support for 3GPP Technical Specification (TS) 29 274 V13.5.0 Release 13 (e.g., and later releases) for GTPv2-C protocol to support CIoT technology.

FIG. 1A is a block diagram of a 4G wireless network with a security platform for providing enhanced security for Cellular Internet of Things (CIoT) in mobile networks in accordance with some embodiments. FIG. 1A is an example service provider network environment for a 4G network architecture that includes a 4G network (e.g., and can also include Wired, Non-3GPP access such as Wi-Fi, 5G, and/or other networks (not shown in FIG. 1A)) to facilitate data communications for subscribers over the Internet 110 to access various applications, web services, content hosts, etc. as shown at 112 and/or other networks 122. As shown in FIG. 1A, a Radio Access Network (RAN) 116 is in communication with a mobile core network/(Evolved Packet Core) EPC 108. RAN 116 can include macro cell(s) in the wireless network, and small cells, such as 4G micro cell(s), 4G pico cell(s), and 4G femto cells in the wireless network (not shown in FIG. 1A). As shown, various Mobile Users 102 (e.g., using User Equipment (UE), such as smart phones, laptops, computers (e.g., which may be in a fixed location), and/or other cellular enabled computing devices/equipment) and various Connected Things 104 (e.g., CIoT, such as ATMs, cameras/sensors such as a security camera (e.g., which may be in a fixed location), an automobile, a baby monitor, a thermostat, and/or various other network enabled computing devices (e.g., any device associated with the Internet of Things (IoT), automobiles, and/or other CIoT devices/equipment)) can communicate using various cells in RAN 116. Also, non-3GPP access 106 (e.g., Wi-Fi access, such as computing devices in offices and/or homes via Wi-Fi routers, and/or other Wi-Fi capable computing devices/equipment) is in communication with mobile core network/EPC 108. As also shown in FIG. 1A, mobile core network/EPC 108 includes various mobile core network components/servers including a billing component/server 130, an IMS server/component 132, an OSS-BSS server/component 134, a DNS server/component 136, and a VAS server/component 138.

Referring to FIG. 1A, network traffic communications are monitored using security platforms in various locations in the mobile core network/EPC 108. As shown, network traffic communications are monitored/filtered using a security platform 140 for network traffic communications before a Serving Gateway (SGW) 118 (e.g., a (virtual) device/appliance that includes a firewall (FW), a network sensor acting on behalf of the firewall, or another device/component that can implement security policies using the disclosed techniques) configured to perform the disclosed security techniques as further described below. As also shown, network traffic communications are monitored/filtered using a security platform 142 for network traffic communications between SGW 118 and a PDN Gateway (PGW) 120 (e.g., a (virtual) device/appliance that includes a firewall (FW), a network sensor acting on behalf of the firewall, or another device/component that can implement security policies using the disclosed techniques) configured to perform the disclosed security techniques as further described below. In this example, security platforms 140 and 142 are also in network communication with a security service 114 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized) via Internet 110. As will now be apparent, network traffic communications can be monitored/filtered using one or more security platforms for network traffic communications in various locations within mobile core network/EPC 108.

Specifically, the traffic passing through the mobile core network between RAN 116 and SGW 118 and also between SGW 118 and PGW 120 of mobile core network/EPC 108 is monitored/filtered using security platforms 140 and 142 (e.g., a firewall (FW), a network sensor acting on behalf of the firewall, or another device/component that can implement security policies using the disclosed techniques) configured to perform the disclosed security techniques as further described below. More specifically, such security monitoring facilitates 3GPP RAN security as shown at 1, non-3GPP RAN security as shown at 2, EPC security as shown at 3, and roaming/peering security as shown at 4 for roaming/peering communications.

Figure 1B:
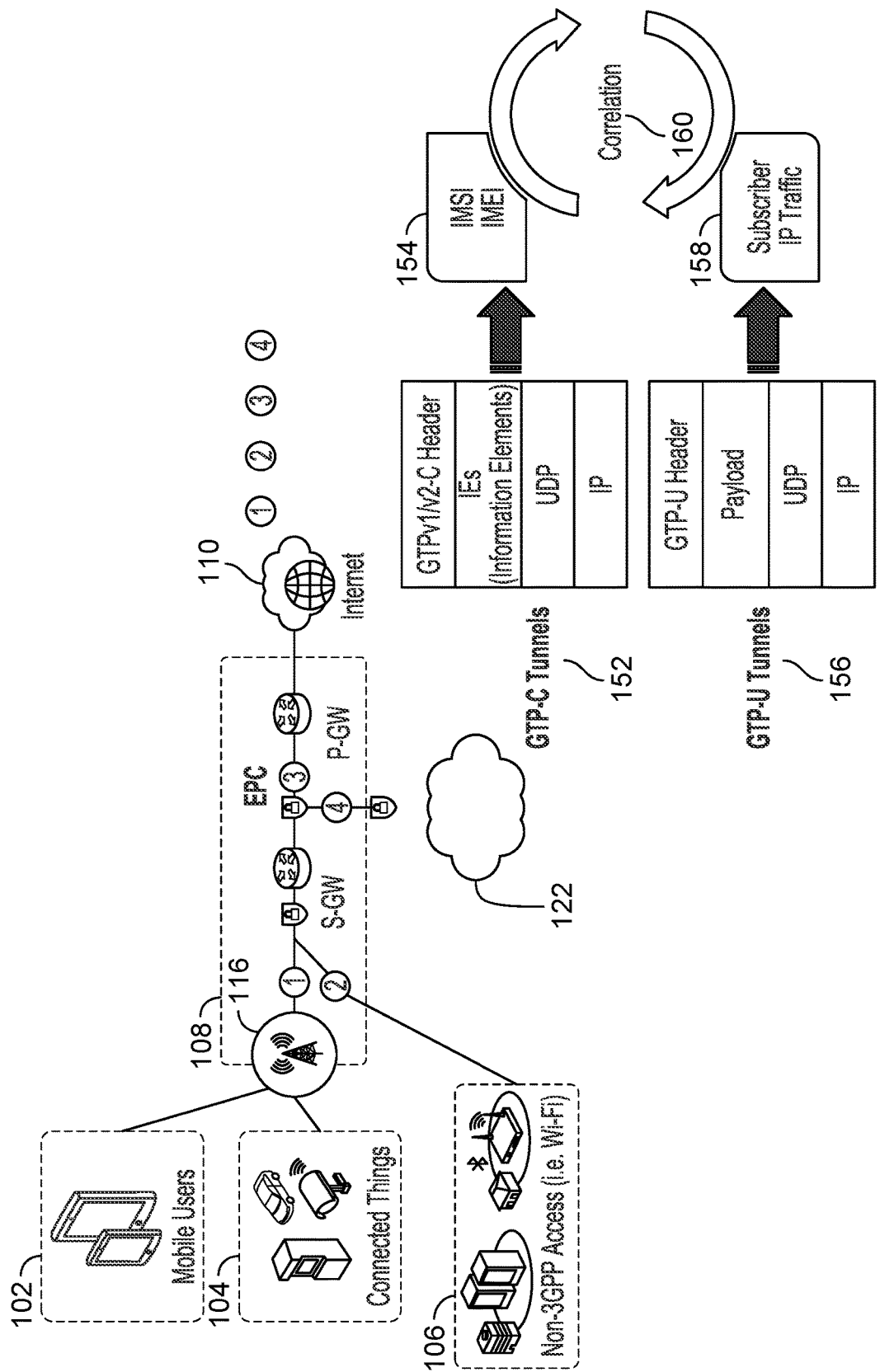
FIG. 1B is another block diagram of a 4G wireless network with a security platform for providing enhanced security for CIoT in mobile networks in accordance with some embodiments.

FIG. 1B is another block diagram of a 4G wireless network with a security platform for providing enhanced security for CIoT in mobile networks in accordance with some embodiments. FIG. 1B is an example service provider network environment for a 4G network architecture that includes EPC of a 4G network (e.g., and can also include Wired, Non-3GPP access such as Wi-Fi, 5G, and/or other networks (not shown in FIG. 1B)) to facilitate data communications for subscribers over the Internet 110 to access various applications, web services, content hosts, etc. as shown at 112 and/or other networks 122. As similarly described above with respect to FIG. 1A, network traffic communications are monitored using security platforms in various locations in the mobile core network/EPC 108.

Referring to FIG. 1B, the disclosed security techniques for CIoT in mobile networks for service providers can be performed to facilitate consistent, correlated, and automated security in all GTP-based locations. For example, GTP-C tunnels as shown at 152 can be monitored to extract IMSI/IMEI information 154. The International Mobile Subscriber Identity (IMSI) is a unique 15 digit number allocated to each mobile subscriber in the GSM/UMTS/EPS system, and the International Mobile Equipment Identity (IMEI) is a unique 15 or 16 digit number allocated to each mobile station equipment. In addition, GTP-U tunnels as shown at 156 can be monitored to extract subscriber IP traffic information 158. As shown at 160, the disclosed security techniques for CIoT in mobile networks for service providers can be performed to facilitate IMSI/IMEI 154 correlation to subscriber IP traffic 158. Various use case scenarios applying the disclosed security techniques to wireless network enabled devices including CIoT devices to facilitate new and enhanced security will be further described below.

Thus, in this example, a network architecture for performing the disclosed security techniques for a 4G network architecture is provided in which a security platform(s) can be provided to perform traffic monitoring and filtering to provide new and enhanced security techniques for CIoT in mobile networks for service providers based on signaling and DPI information as further described below. As will now be apparent to one of ordinary skill in the art in view of the disclosed embodiments, a security platform(s) can similarly be provided in various other locations within the network architecture (e.g., an inline, pass-through NGFW, such as shown by security platforms 140, 142, 144, and/or implemented as agents or virtual machines (VM) instances, which can be executed on existing devices in the service provider's network, such as SGW 118 and/or PGW 120) and in various wireless network environments, such as 4G, 5G, and/or other wireless network environments to perform the disclosed security techniques as further described below. As also described further below, the disclosed security techniques can similarly be applied to roaming devices that connect to the mobile core of the wireless network environment.

Figure 2:
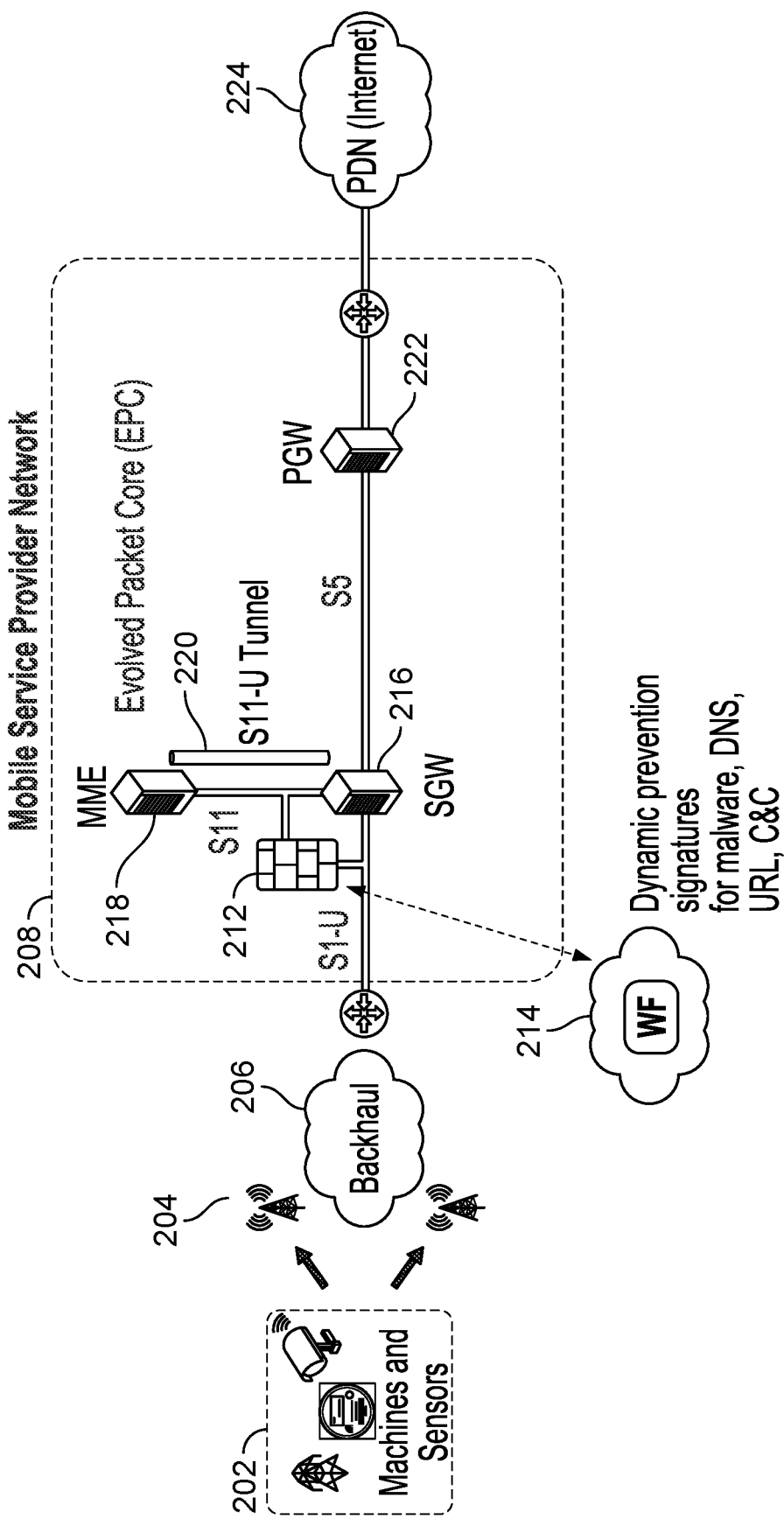
FIG. 2 is another block diagram of a 4G wireless network with a security platform for providing enhanced security for CIoT in mobile networks in accordance with some embodiments.

FIG. 2 is another block diagram of a 4G wireless network with a security platform for providing enhanced security for CIoT in mobile networks in accordance with some embodiments. FIG. 2 is an example service provider network environment for a 4G network architecture that includes a 4G network (e.g., and can also include Wired, Non-3GPP access such as Wi-Fi, 5G, and/or other networks (not shown in FIG. 2)) to facilitate data communications for subscribers over the Packet Data Network (PDN) (e.g., Internet) 224 to access various applications, web services, content hosts, etc. As shown in FIG. 2, a Radio Access Network (RAN) 204 is in communication with a mobile core network/EPC 208 via a backhaul network 206. RAN 204 can include macro cell(s) in the wireless network, and small cells, such as 4G micro cell(s), 4G pico cell(s), and 4G femto cells in the wireless network (not shown in FIG. 2). As shown, various Connected Things 104 (e.g., CIoT, such as various machines and sensors 202, which can include, for example, ATMs, cameras/sensors such as a security camera (e.g., which may be in a fixed location), an automobile, a baby monitor, a thermostat, and/or various other network enabled computing devices (e.g., any device associated with the Internet of Things (IoT), automobiles, and/or other CIoT devices/equipment)) can communicate using various cells in RAN 116. As shown in FIG. 2, mobile core network/EPC 208 include various mobile core network components/servers including a Serving Gateway (SGW) 216, a Mobility Management Entity (MME) 218, and a Packet Gateway (PGW) 222, and as similarly discussed above, mobile core network/EPC 208 can include various other servers/components, such as a billing component/server, an IMS server/component, an OSS-BSS server/component, a DNS server/component, and/or a VAS server/component (not shown in FIG. 2).

Referring to FIG. 2, network traffic communications can be monitored using security platforms in various locations (e.g., to monitor S1-U, S11-U, S5, and/or other communications) in the mobile core network/EPC 208 as similarly described above with respect to FIG. 1A. As shown in FIG. 2, network traffic communications are monitored/filtered using a security platform 212 for network traffic communications including S1-U communications before SGW 216 (e.g., a (virtual) device/appliance that includes a firewall (FW), a network sensor acting on behalf of the firewall, or another device/component that can implement security policies using the disclosed techniques), in which security platform 212 is configured to perform the disclosed security techniques as further described below. As also shown, network traffic communications including S11-U communications are monitored/filtered using security platform 212 for network traffic communications between SGW 216 and MME 218, in which security platform 212 is configured to perform the disclosed security techniques as further described below. In this example, security platform 212 can monitor an S11 interface to monitor S11-U tunnel communications between SGW 216 and MME 218 as shown at 220. In this example implementation, various other network traffic communications, such as S5 communications between SGW 216 and PGW 222, can be monitored using another security platform (not shown). As also shown, security platform 212 is also in network communication with a security service 214 (e.g., a commercially available cloud-based security service, such as the WildFire™ (WF) cloud-based malware analysis environment that is a commercially available cloud security service provided by Palo Alto Networks, Inc., which includes automated security analysis of malware samples as well as security expert analysis, or a similar solution provided by another vendor can be utilized), such as for dynamic prevention signatures for malware, DNS, URL, command and control (C&C), and/or various other security updates and/or cloud-based malware samples analysis. As will now be apparent, network traffic communications can be monitored/filtered using one or more security platforms for network traffic communications in various locations within mobile core network/EPC 208.

Figure 3:
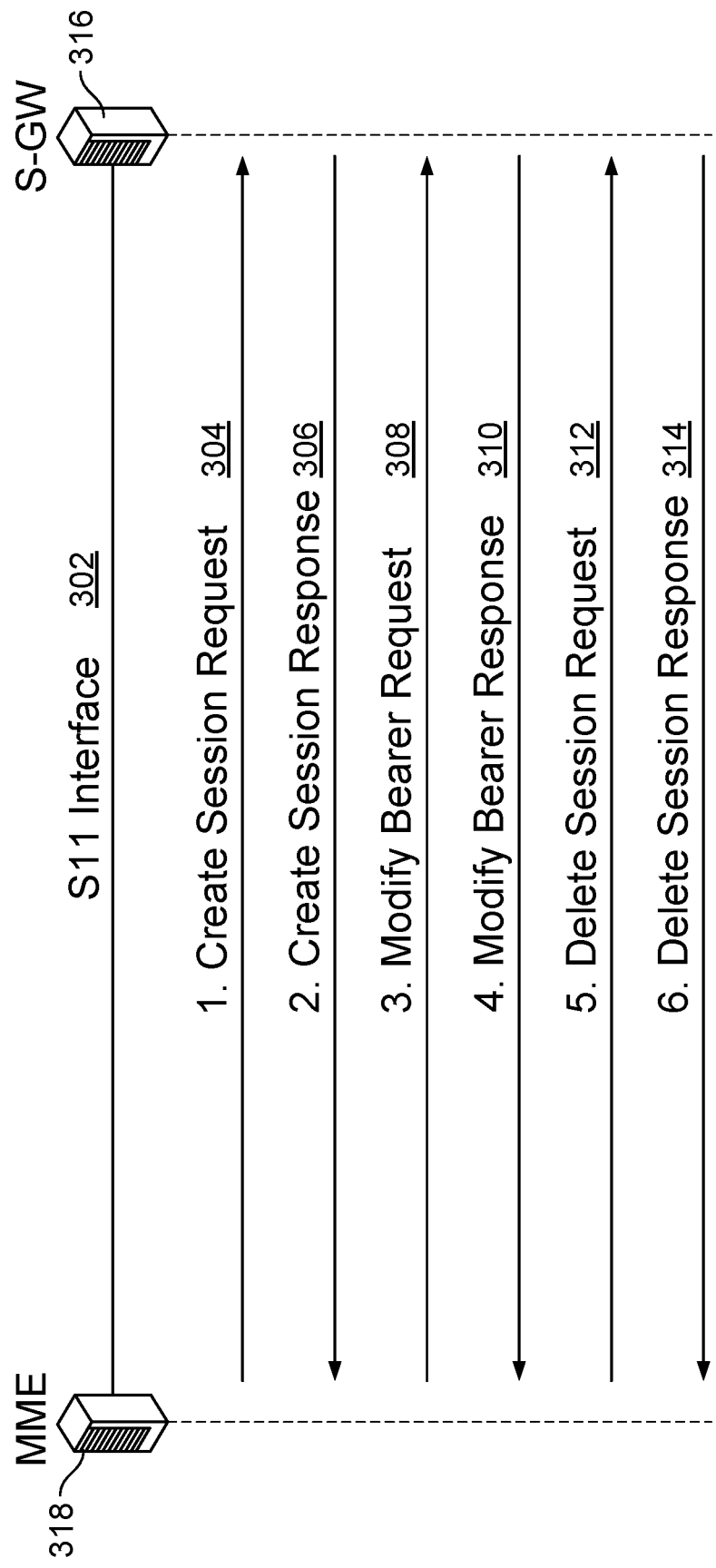
FIG. 3 is an example flow of GTPv2-C messages over an S11 interface exchanged between an SGW and an MME in a 4G network in accordance with some embodiments.

FIG. 3 is an example flow of GTPv2-C messages over an S11 interface exchanged between an SGW and an MME in a 4G network in accordance with some embodiments. Specifically, FIG. 3 shows GTPv2-C messages exchanged for activating, updating, and deactivating GTP sessions between an SGW 316 and an MME 318 in a 4G network using an S11 interface 302. GTP is a standardized protocol that is based on the User Datagram Protocol (UDP).

Referring to FIG. 3, a first message that is sent from MME 318 to SGW 316 is a Create PDP Session Request message as shown at 304. The Create Session Request message is a message to allocate a session for a new network communication access request for a mobile device in a 4G network (e.g., to be provided with a tunnel for user IP packets for network communications over a mobile service provider's network). For example, the Create Session Request message can include location, hardware identity (e.g., IMEI), subscriber identity (e.g., Access Point Name (APN) information, and/or radio access technology (RAT) information in the new network communication access request for the mobile device.

As shown in FIG. 3, after session establishment as shown at 304, SGW 316 sends a Create Session Response message to MME 318 as shown at 306 to indicate whether the Create Session Request is granted or not for the mobile device (e.g., whether to allow tunneled user data traffic (over the S11 interface) in the mobile core network for the mobile device). The Create Session Request and Create Session Response messages sent using UDP communications (e.g., on port 2123) are used for creating the initial setup context for the session as shown in FIG. 3.

As also shown in FIG. 3, a Modify Bearer Request message shown at 308 and a Modify Bearer Response message shown at 310 are exchanged between the MME and SGW. For example, Modify Bearer Request/Response messages sent using UDP communications (e.g., on port 2123) can be used to update one or more parameters for the connection/session. After a session is completed, a Delete Session Request message shown at 312 and a Delete Session Response message shown at 314 are exchanged between the MME and SGW.

In one embodiment, the disclosed techniques perform inspection of signaling/control traffic in service provider networks, such as GTP-C traffic, and inspection of tunneled user traffic in service provider networks, such as GTP-U traffic (e.g., using a security platform, such as implemented using an NGFW that is capable of performing DPI to identify an APP ID, a user ID, a content ID, perform URL filtering, and/or other firewall/security policy for security/threat detection/prevention). In one embodiment, the disclosed techniques perform inspection of signaling/control traffic in service provider networks, such as GTP-C traffic, to extract information exchanged in the GTP-C traffic (e.g., parameters, such as location information associated with the subscriber/mobile device, device ID/IMEI, subscriber information/IMSI, APN information, and/or RAT, such as further described below). In one embodiment, the disclosed techniques perform inspection of signaling/control traffic in service provider networks, such as GTP-C traffic, to extract information exchanged in the GTP-C traffic (e.g., parameters, such as described above and further described below) as well as to monitor tunneled user traffic in service provider networks (e.g., using DPI, such as described above and further described below).

In an example implementation, the security platform is configured to monitor the respective interfaces, including the S11 interface, of the MME and SGW to monitor control/signaling traffic (e.g., GTP-C messages) and tunneled user traffic (GTP-U) to implement a security platform with GTP monitoring capabilities that implements security policies for providing enhanced CIoT security with content related to subscribers and mobile devices (e.g., subscriber/mobile device), which can use, for example, parameters, such as location information associated with the subscriber/mobile device, device ID/IMEI, subscriber information/IMSI, APN information, and/or RAT, and/or any other parameters/information that can be extracted from control/signaling traffic (e.g., GTP-C messages) as well as performing DPI for IP packets inside the tunnel, as further described below. As described above, the location information/parameters, hardware identity (e.g., IMEI), subscriber identity (e.g., IMSI), APN information, and/or radio access technology (RAT) can be extracted from the Create Session Request message by the security platform, which can be stored (e.g., cached as associated with the IP flow) for use in applying a security policy based on this extracted information and/or in combination with DPI, such as further described below.

As an example, the disclosed techniques can be performed to facilitate CIoT security with context related to subscriber and mobile device based on application identification (e.g., APP ID) and control for CIoT traffic with IMSI and IMEI correlation as similarly described herein.

As another example, the disclosed techniques can be performed to facilitate threat detection and prevention for CIoT traffic with IMSI and IMEI correlation as similarly described herein.

As yet another example, the disclosed techniques can be performed to facilitate URL filtering for CIoT traffic with IMSI and IMEI correlation as similarly described herein.

Accordingly, mobile service providers can utilize the security platform to implement the disclosed techniques to protect its mobile core network infrastructure from CIoT as further described below. For instance, mobile service providers can utilize the security platform to implement the disclosed techniques to provide various security services to CIoT customers, such as smart utility (e.g., smart meters for gas, water, and/or electricity), smart agriculture, and/or various other customers.

Figure 4:
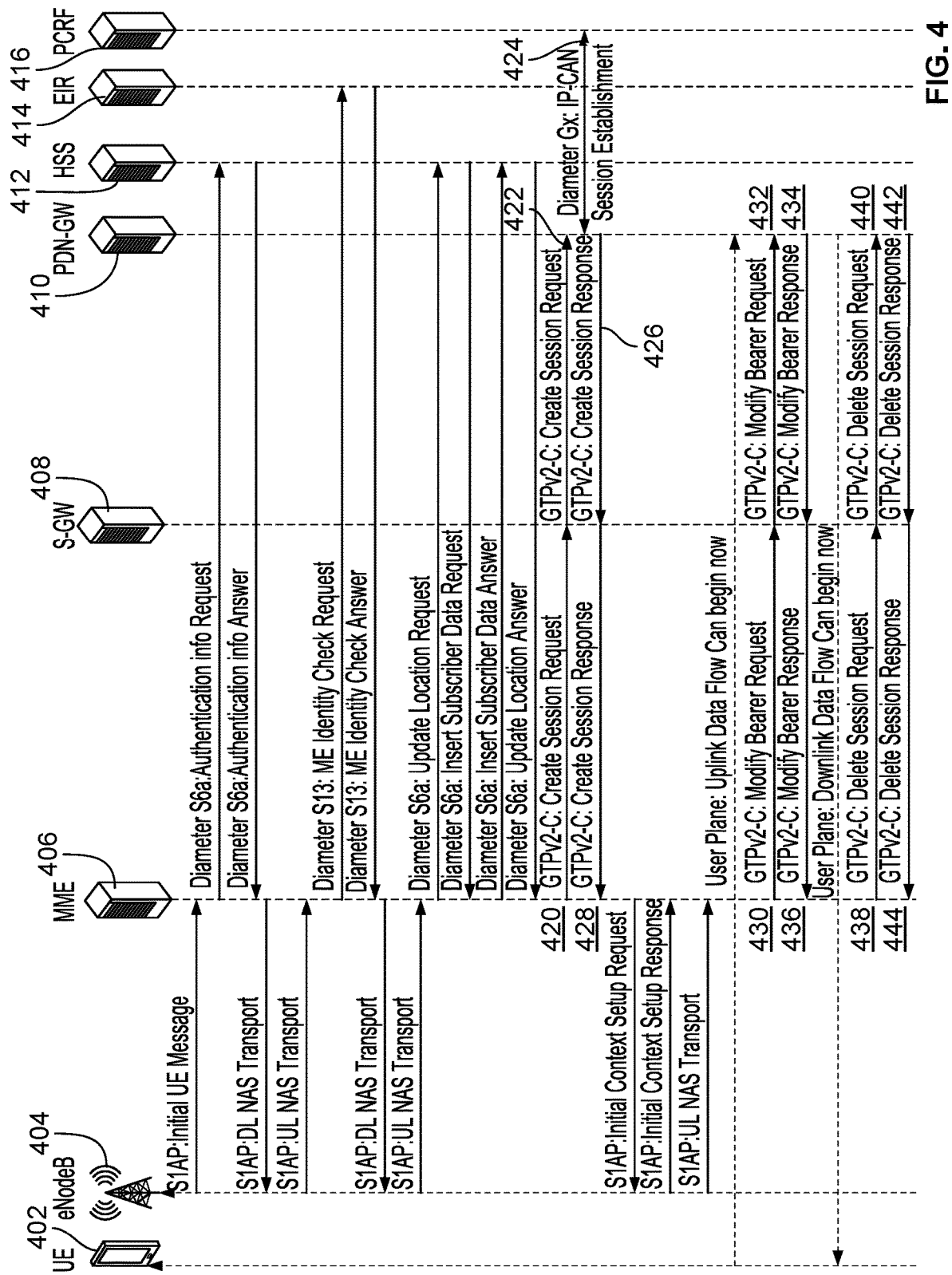
FIG. 4 is an example of GTPv2-C messages exchanged between entities including an MME, an SGW, and a PGW in a 4G/LTE network in accordance with some embodiments.

FIG. 4 is an example of GTPv2-C messages exchanged between entities including an MME, an SGW, and a PGW in a 4G/LTE network in accordance with some embodiments. Specifically, FIG. 4 shows GTPv2-C messages exchanged for an LTE Attach procedure with details of the GTPv2-C messages exchanged between a UE 402, an eNodeB 404, an MME 406, an SGW 408, a PDN-GW (PGW) 410, a Home Subscriber Server (HSS) 412, an Equipment Identity Register (EIR) 414, and a Policy Charging Function and Control (PCRF) entity 416 in a 4G/LTE network. As discussed above, GTP is a standardized protocol that is based on the User Datagram Protocol (UDP).

Referring to FIG. 4, a Create Session Request message is sent from MME 406 to SGW 408 as shown at 420 and then from SGW 408 to PGW 410 as shown at 422. The Create Session Request message is a message to allocate a control and data channel for a new network communication access request for a mobile device in a 4G/LTE network (e.g., to be provided with a tunnel for user IP packets for network communications over a mobile service provider's network). For example, the GTP Create Session Request message can include location, hardware identity (e.g., IMEI), subscriber identity (e.g., IMSI), APN information, and/or radio access technology (RAT) information in the new network communication access request for the mobile device.

In one embodiment, the security platform monitors GTP-C messages between the MME, SGW, and PGW to extract certain information included within GTP-C messages based on a security policy (e.g., monitoring GTPv2-C messages using a pass through firewall/NGFW that is located between the MME, SGW, and PGW or using a firewall/NGFW implemented as VM instances or agents executed on the MME, SGW, and PGW, and/or other entities in the mobile core network). For example, the security platform can monitor GTP-C messages and extract the location, hardware identity (e.g., IMEI), subscriber identity (e.g., IMSI), and/or radio access technology (RAT) from the Create Session Request message, such as further described below.

As shown in FIG. 4, after session establishment as shown at 424, PGW 410 sends a Create Session Response message as shown at 426 to SGW 408 and then from SGW 408 to MME 406 as shown at 428 to indicate whether the Create Session Request is granted or not for the mobile device (e.g., whether to allow tunneled user data traffic in the mobile core network for the mobile device). The Create Session Request and Create Session Response messages sent using UDP communications on port 2123 are used for creating the initial setup context for the session as shown in FIG. 4.

As also shown in FIG. 4, Modify Bearer Request messages shown at 430 and 432 and Modify Bearer Response messages shown at 434 and 436 are exchanged between the MME, SGW, and PGW. For example, Modify Bearer Request/Response messages sent using UDP communications on port 2123 can be used to update one or more parameters for the connection/session. Finally, Delete Session Request messages shown at 438 and 440 and Delete Session Response messages shown at 442 and 444 are exchanged between the MME, SGW, and PGW.

In one embodiment, the disclosed techniques perform inspection of signaling/control traffic in service provider networks, such as GTP-C traffic, and inspection of tunneled user traffic (e.g., including the S11-U tunnel between the SGW and MME) in service provider networks, such as GTP-U traffic (e.g., using a security platform, such as implemented using an NGFW that is capable of performing DPI to identify an APP ID, a user ID, a content ID, perform URL filtering, and/or other firewall/security policies for security/threat detection/prevention). In one embodiment, the disclosed techniques perform inspection of signaling/control traffic in service provider networks, such as GTP-C traffic, to extract information exchanged in the GTP-C traffic (e.g., parameters, such as location information associated with the subscriber/mobile device, device ID/IMEI, subscriber information/IMSI, APN information, and/or RAT, such as further described below). In one embodiment, the disclosed techniques perform inspection of signaling/control traffic in service provider networks, such as GTP-C traffic, to extract information exchanged in the GTP-C traffic (e.g., parameters, such as described above and further described below) as well as to monitor tunneled user traffic in service provider networks (e.g., using DPI, such as described above and further described below).

In an example implementation, the security platform is configured to monitor the respective interfaces (e.g., including the S11 interface between the SGW and MME) of the MME, SGW, and PGW to monitor control/signaling traffic (e.g., GTP-C messages) and tunneled user traffic (GTP-U) to implement a security platform with GTP monitoring capabilities that implements security policies, which can use, for example, parameters, such as location information associated with the subscriber/mobile device, device ID/IMEI, subscriber information/IMSI, APN information, and/or RAT, and/or any other parameters/information that can be extracted from control/signaling traffic (e.g., GTP-C messages) as well as performing DPI for IP packets inside the tunnel, as further described below. As described above, the location information/parameters, hardware identity (e.g., IMEI), subscriber identity (e.g., IMSI), APN information, and/or radio access technology (RAT) can be extracted from the Create Session Request message by the security platform, which can be stored (e.g., cached as associated with the IP flow) for use in applying a security policy based on this extracted information and/or in combination with DPI, such as further described below.

The disclosed techniques are illustrated and generally described herein with respect to performing network traffic inspection in a 4G Evolved Packet Core (EPC) using the GTPv2-C and GTP-U protocols, and/or can be similarly implemented in other mobile core networks/using other mobile network protocols (e.g., such as for 5G core networks or other mobile networks/protocol) that include location, device, subscriber, APN information, and/or RAT parameters/information (e.g., location information, hardware identity, subscriber identifier information, RAT type information and/or other user/device/network specific parameters in the respective protocols) and/or tunneled user traffic on service provider networks for mobile device communications.

Techniques for Access Point Name and Application Identity Based Security Enforcement in Mobile Networks for Service Providers In a mobile network, an Access Point Name (APN) is a reference to a PGW/GGSN, and the APN identifies the form of access to another network, such as the Internet. For example, when a UE sets up a connection (PDP context/Bearer), an access point is selected. Mobile network operators generally use public and private types of APN's to provide their subscribers access to the Internet, Voice over LTE (VoLTE), enterprise/corporate, and machine to machine (M2M)/IoT networks. Mobile and IoT devices can store APN settings, which can be pre-configured, and these APN settings can generally be changed manually or can also be remotely pushed by the mobile network operator.

The APN information/parameter generally includes two components/parts. First, the APN information parameter includes an APN Network Identifier that specifies the external network to which the GGSN/PGW is connected and optionally a requested service by the mobile station (e.g., this part of the APN is generally required as defined in 3GPP TS 23.003). Second, the APN information parameter includes an Operator Identifier that specifies on which PLMN GPRS/EPS backbone the GGSN/PGW is located (e.g., this part of the APN is generally optional as defined in 3GPP TS 23.003). The APN structure including format is defined in 3GPP TS 23.003.

In one embodiment, the disclosed techniques for enhanced security in mobile networks for service providers include providing APN based security in mobile networks for service providers. For example, mobile service providers can apply the disclosed techniques to provide APN based security (e.g., in combination with application identity (Application-ID) using an NGFW) to user devices (e.g., mobile devices of subscribers) and/or IoT devices that connect to their mobile network using 3G, 4G, or 5G Radio Access Technology (RAT) to facilitate mobile service providers to apply APN and Application-ID based security to mobile users and IoT devices who connect to their network using 3G, 4G or 5G RAT (e.g., in which the mobile/IoT devices include SIM cards or Embedded-SIM/Embedded Universal Integrated Circuit Cards (eUICC)).

In one embodiment, the disclosed techniques for enhanced security in mobile networks for service providers include providing enhanced security in mobile networks for service providers using an APN and Application-ID. For example, mobile service providers can apply the disclosed techniques to provide enhanced security to user devices (e.g., mobile devices of subscribers) and/or IoT devices that connect to their mobile network using 3G, 4G, or 5G Radio Access Technology (RAT) based on an APN and Application-ID (e.g., an Application-ID can be determined by a security platform monitoring tunneled user traffic that is inspected using DPI techniques implemented by an NGFW as further described below).

In one embodiment, mobile service providers can apply the disclosed techniques to provide new and enhanced security services using an APN and/or using an APN and Application-ID. For example, mobile service providers can apply the disclosed techniques to provide a firewall service using an APN and Application-ID in mobile and converged networks (e.g., applying a firewall/security policy per APN and Application-ID). As another example, mobile service providers can apply the disclosed techniques to provide a threat detection service using an APN and Application-ID in mobile and converged networks (e.g., an APN based, basic threat detection service for known threats, an APN based, advanced threat detection service for unknown threats, and/or other threat detection services that can utilize APN based information to apply security policies). As yet another example, mobile service providers can apply the disclosed techniques to provide a threat prevention service for known threats using an APN and Application-ID in mobile and converged networks (e.g., an APN based, basic threat prevention service for known threats, an APN based, advanced threat prevention service for unknown threats, and/or other threat prevention services that can utilize APN based information to apply security policies). As an additional example, mobile service providers can apply the disclosed techniques to provide a URL filtering service using an APN and Application-ID in mobile and converged networks (e.g., URL filtering can be performed per APN and Application-ID). As a further example, mobile service providers can apply the disclosed techniques to provide an application Denial of Service (DoS) detection service for DoS attacks using an APN and Application-ID in mobile and converged networks. As another example, mobile service providers can apply the disclosed techniques to provide an application Denial of Service (DoS) prevention service for DoS attacks using an APN and Application-ID in mobile and converged networks.

In one embodiment, the disclosed techniques for enhanced security in mobile networks for service providers include performing APN based security in mobile networks using a security platform that can implement security policies based on an APN (e.g., in combination with Application-ID and/or other criteria, such as location based, subscriber/user identity based, mobile device identifier based, RAT based, and/or combinations thereof, as further described herein). For example, a security platform can monitor GTP-C traffic in a mobile network and process (e.g., parse) GTP-C messages to extract APN information (e.g., APN information can be extracted from a Create PDP Request message in a 3G mobile network or a Create Session Request message in a 4G mobile network).

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, a security platform is configured to extract APN information (e.g., APN Network Identifier) from a GTPv1-C Create PDP Request (e.g., sent from an SGSN node to a GGSN node as a part of the GPRS PDP Context Activation procedure in a 3G mobile network). In one embodiment, a security platform is configured to extract APN information (e.g., APN Network Identifier) from a GTPv2-C Create Session (e.g., in a 4G mobile network).

For example, a GTPv2-C Create Session Request message can generally be sent by various network elements in a mobile network (e.g., Serving Gateway (SGW), Mobility Management Entity (MME), and/or other network elements in the mobile network) as similarly described herein with respect to FIG. 2B. Also, such a Create Session Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3GPP IP access to E-UTRAN, and/or other procedures). The APN information (e.g., APN Network Identifier and Operator Identifier) is generally present in a GTPv2-C Create Session Request message as specified in 3GPP TS 29.274.

As another example, the security platform can extract APN information (e.g., APN Network Identifier and Operator Identifier) from GTPv1-C Create PDP Request messages, which are generally sent from an SGSN node to a GGSN node as a part of the GPRS PDP Context Activation procedure as similarly described above with respect to FIG. 2A.

Below are Examples of APN's in GTP-C Messages:
(1) abc.mnc123.mcc789.gprs;
(2) xyz.carcompanyname1.country2;
(3) M2M.COMPANYX;
(4) IOT1.mnc888.mcc999; and
(5) internet.mnc666.mcc777.

Accordingly, the disclosed techniques for enhanced security in mobile networks for service providers include performing security in mobile networks using a security platform that can implement security policies (e.g., for users/subscribers of the mobile network) based on APN and Application-ID. In addition, the disclosed techniques for enhanced security in mobile networks for service providers include performing security in mobile networks using a security platform that can implement security policies (e.g., for mobile devices and/or IoT devices) based on APN and Application-ID.

In one embodiment, the security platform can extract APN information to perform security based on a security policy that can be applied based on the APN information. In one embodiment, the security platform can extract APN information and perform DPI to identify an Application-ID to perform security based on a security policy that can be applied based on the APN information and Application-ID.

In one embodiment, the security platform can extract APN information and perform DPI to identify an Application-ID to perform security based on a security policy that can be applied based on the APN information and Application-ID. For example, the security platform can perform threat detection by applying a security policy per APN and Application-ID in mobile and converged networks using the disclosed techniques. As another example, the security platform can perform threat prevention by applying a security policy per APN and Application-ID in mobile and converged networks using the disclosed techniques. As yet another example, the security platform can perform URL filtering by applying a security policy per APN and Application-ID in mobile and converged networks using the disclosed techniques. Example use case scenarios for enhanced security that can be performed on mobile networks for service providers using such APN information and Application-ID are further described below (e.g., mobile network operators can define and apply security policy per similar type of IoT/M2M devices, such as water meters, tracking devices, medical equipment, and/or other IoT/M2M devices as further described below).

As will now be apparent to those of ordinary skill in the art, mobile service providers (e.g., service providers of mobile/converged networks, service providers of mobile devices or IoTs, security service providers, or other entities that provide devices/services associated with using mobile/converged networks) can provide each of these APN based firewall services or combinations thereof (e.g., APN and Application-ID based firewall services) as well as various other APN based services using the disclosed techniques. Also, mobile service providers can apply the disclosed techniques to provide such using APN based firewall services in combination with various other enhanced security services, such as location based, subscriber/user identity based, mobile device identifier based, RAT based, and/or combinations thereof, as described above and further described below.

These and other techniques for providing enhanced security in mobile networks for service providers based on APN information and Application-ID (e.g., and/or other DPI and/or NGFW techniques, such as user ID, content ID, URL filtering, etc.) will be further described below.

Techniques for Location Based Security in Mobile Networks for Service Providers

In one embodiment, the disclosed techniques for enhanced security in mobile networks for service providers include providing location based security in mobile networks for service providers. For example, mobile service providers (e.g., service providers of mobile networks, service providers of mobile devices or IoTs, security service providers, or other entities that provide devices/services associated with using mobile networks) can apply the disclosed techniques to provide location based security to user devices (e.g., mobile devices of subscribers) and/or IoT devices that connect to their mobile network using 3G, 4G, or 5G Radio Access Technology (RAT).

In one embodiment, mobile service providers can apply the disclosed techniques to provide new and enhanced location based security services. For example, mobile service providers can apply the disclosed techniques to provide a location based firewall service. As another example, mobile service providers can apply the disclosed techniques to provide a location based threat detection service (e.g., a location based, basic threat detection service for known threats, a location based, advanced threat detection service for unknown threats, and/or other threat detection services that can utilize location based information to apply security policies). As yet another example, mobile service providers can apply the disclosed techniques to provide a location based threat prevention service for known threats (e.g., a location based, basic threat prevention service for known threats, a location based, advanced threat prevention service for unknown threats, and/or other threat prevention services that can utilize location based information to apply security policies). As an additional example, mobile service providers can apply the disclosed techniques to provide a location based URL filtering service.

In one embodiment, the disclosed techniques for enhanced security in mobile networks for service providers include performing location based security in mobile networks using a security platform that can implement security policies based on location information. For example, a security platform can monitor GTP-C traffic in a mobile network and process (e.g., parse) GTP-C messages to extract location information (e.g., location information can be extracted from a Create PDP Request message sent from an SGSN to a GGSN in a mobile core network).

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, a security platform is configured to extract user location information from a GTPv1-C Create PDP Request (e.g., in a 3G mobile network). In one embodiment, a security platform is configured to extract user location information from a GTPv2-C Create Session (e.g., in a 4G mobile network).

For example, such a Request message can generally be sent by various network elements in a mobile network (e.g., Serving Gateway (SGW), Mobility Management Entity (MME), and/or other network elements in the mobile network). Also, such a Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3gpp IP access to E-UTRAN, and/or other procedures). The user Location Information Element (IE) is generally present in a GTPv2-C Create Session Request message as specified in 3GPP TS 29.274.

In one embodiment, the security platform can extract location identifiers (e.g., Location IEs) (e.g., supported by GTPv1-C, GTPv2-C, or other network protocols) that can be used to apply security in mobile networks for service providers. Example location identifiers supported by GTPv2-C that can be used to apply security in mobile networks for service providers include the following: CGI (Cell Global Identifier), SAI (Service Area Identifier), RAI (Routing Area Identifier), TAI (Tracking Area Identifier), ECGI (E-UTRAN Cell Global Identifier), LAC (Location Area Identifier), and/or other location identifiers or combinations thereof. Specifically, CGI (Cell Global Identifier) generally provides location information that includes the following parameters: MCC (Mobile Country Code), MNC (Mobile Network Code), LAC (Location Area Code), and CI (Cell Identity) (e.g., CI is generally an area of several hundreds of meters within the base station). SAI (Service Area Identifier) generally provides location information that includes the following parameters: MCC, MNC, LAC, and SAC (Service Area Code). RAI (Routing Area Identifier) generally provides location information that includes the following parameters: MCC, MNC, LAC, and RAC (Routing Area Code). TAI (Tracking Area Identifier) generally provides location information that includes the following parameters: MCC, MNC, and TAC (Tracking Area Code). ECGI (E-UTRAN Cell Global Identifier) generally provides location information that corresponds to MCC, MNC, and ECI (E-UTRAN Cell Identifier). LAC (Location Area Identifier) generally provides location information that includes the following parameters: MCC, MNC, and LAC.

For example, the security platform can monitor GTPv2-C Create Session Request messages to extract such location parameters. Specifically, CGI, SAI, RAI, TAI ECGI, and LAC are included as parameters that can be extracted from a GTPv2-C Create Session Request message. In some cases, the GTPv2-C Create Session Request message can include two or more of such location parameters (e.g., CGI and SAI). Example use case scenarios for enhanced security that can be performed on mobile networks for service providers using such location information are further described below (e.g., a fire emergency use case scenario that uses location information to restrict flying drones from being used in a specific area by/near the fire emergency as further described below).

As another example, the security platform can extract user location information from GTPv1-C Create PDP Request messages, which are generally sent from an SGSN node to a GGSN node as a part of the GPRS PDP Context Activation procedure as similarly described herein with respect to FIG. 2A. The user Location Information Element (IE) is generally present in a GTPv1-C Create PDP Context Request message as specified in 3GPP TS 29.060. Example location identifiers supported by GTPv1-C that can be used to apply security in mobile networks for service providers include the following: CGI (Cell Global Identifier), SAI (Service Area Identifier), and RAI (Routing Area Identifier), and/or other location identifiers or combinations thereof. Specifically, CGI (Cell Global Identifier) generally provides location information that includes the following parameters: MCC (Mobile Country Code), MNC (Mobile Network Code), LAC (Location Area Code), and CI (Cell Identity) (e.g., CI is generally an area of several hundreds of meters within the base station). SAI (Service Area Identifier) generally provides location information that includes the following parameters: MCC, MNC, LAC, and SAC (Service Area Code). RAI (Routing Area Identifier) generally provides location information that includes the following parameters: MCC, MNC, LAC, and RAC (Routing Area Code).

Accordingly, the disclosed techniques for enhanced security in mobile networks for service providers include performing location based security in mobile networks using a security platform that can implement security policies based on location information.

In one embodiment, the security platform can extract location information to perform security based on a security policy that can be applied based on the location information (e.g., per CGI, SAI, RAI, TAI, ECGI, and/or LAC in the mobile network). In one embodiment, the security platform can extract location information to perform threat detection based on a security policy that can be applied based on the location information (e.g., per CGI, SAI, RAI, TAI, ECGI, and/or LAC in the mobile network).

In one embodiment, the security platform can extract location information to perform threat prevention based on a security policy that can be applied based on the location information (e.g., per CGI, SAI, RAI, TAI, ECGI, and/or LAC in the mobile network).

In one embodiment, the security platform can extract location information to perform URL filtering based on a security policy that can be applied based on the location information (e.g., per CGI, SAI, RAI, TAI, ECGI, and/or LAC in the mobile network).

In one embodiment, the security platform can extract location information to perform threat detection, threat prevention, URL filtering, and/or other security techniques (e.g., including using DPI-based security techniques from monitored tunneled user traffic) based on a security policy that can be applied based on the location information (e.g., per CGI, SAI, RAI, TAI, ECGI, and/or LAC in the mobile network).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these location based firewall services or combinations thereof as well as various other location based services using the disclosed techniques. Also, mobile service providers can apply the disclosed techniques to provide such location based firewall services in combination with various other enhanced security services, such as subscriber/user identity based, hardware identity based, RAT based, and/or combinations thereof, as further described below.

These and other techniques for providing enhanced security in mobile networks for service providers based on location information (e.g., and/or in combination with other DPI and/or NGFW techniques, such as Application-ID, user ID, content ID, URL filtering, etc.) will be further described below.

Techniques for Mobile Equipment Identity and/or IoT Equipment Identity Based Security Enforcement in Mobile Networks for Service Providers As discussed above, the International Mobile Equipment Identity (IMEI) is a unique identifier (e.g., a 16 or 15 digit code) that is generally used to identify a mobile device (e.g., a hardware device) to a mobile network (e.g., a GSM or UMTS network). For example, the IMEI can provide a unique hardware identifier (ID) for a mobile device/station, including a mobile/smart phone, laptop, tablet, or other computing device, or an IoT device, or any other device that has a Subscriber Identity Module (SIM) card or Embedded-SIM/Embedded Universal Integrated Circuit Card (eUICC) and communicates on a mobile network or any other device (e.g., a GSM or UMTS network). In an example implementation, Mobile Equipment Identity/IMEI and/or IoT Equipment identity (e.g., IMEI or IMEISV) as defined in 3GPP TS 23.003, and Application-ID based security that can be implemented using an NGFW by parsing GTP-C messages for IMEI/IMEISV information and inspecting tunneled traffic (e.g., DPI of GTP-U traffic) are further described herein.

In one embodiment, the disclosed techniques for enhanced security in mobile networks for service providers include providing a mobile device identifier based security in mobile networks for service providers. For example, mobile service providers can apply the disclosed techniques to provide mobile device identifier based security (e.g., in combination with Application-ID using an NGFW) to user devices (e.g., mobile devices of subscribers) and/or IoT devices that connect to their mobile network using 3G, 4G, or 5G Radio Access Technology (RAT).

In one embodiment, the disclosed techniques for enhanced security in mobile networks for service providers include providing enhanced security in mobile networks for service providers using a mobile device identifier and Application-ID. For example, mobile service providers can apply the disclosed techniques to provide enhanced security to user devices (e.g., mobile devices of subscribers) and/or IoT devices that connect to their mobile network using 3G, 4G, or 5G Radio Access Technology (RAT) based on a mobile device identifier and Application-ID (e.g., an Application-ID can be determined by a security platform monitoring tunneled user traffic that is inspected using DPI techniques implemented by an NGFW as further described below).

In one embodiment, mobile service providers can apply the disclosed techniques to provide new and enhanced security services using a mobile device identifier and/or using a mobile device identifier and Application-ID. For example, mobile service providers can apply the disclosed techniques to provide a firewall service using a mobile device identifier and Application-ID. As another example, mobile service providers can apply the disclosed techniques to provide a threat detection service using a mobile device identifier and Application-ID (e.g., a mobile device identifier based, basic threat detection service for known threats, a mobile device identifier based, advanced threat detection service for unknown threats, and/or other threat detection services that can utilize mobile device identifier based information to apply security policies). As yet another example, mobile service providers can apply the disclosed techniques to provide a threat prevention service for known threats using a mobile device identifier and Application-ID (e.g., a mobile device identifier based, basic threat prevention service for known threats, a mobile device identifier based, advanced threat prevention service for unknown threats, and/or other threat prevention services that can utilize mobile device identifier based information to apply security policies). As an additional example, mobile service providers can apply the disclosed techniques to provide a URL filtering service using a mobile device identifier and Application-ID. As a further example, mobile service providers can apply the disclosed techniques to provide an application Denial of Service (DoS) detection service for DoS attacks using a mobile device identifier and Application-ID. As another example, mobile service providers can apply the disclosed techniques to provide an application Denial of Service (DoS) prevention service for DoS attacks using a mobile device identifier and Application-ID.

In one embodiment, the disclosed techniques for enhanced security in mobile networks for service providers include performing mobile device identifier based security in mobile networks using a security platform that can implement security policies based on mobile device identifier information. For example, a security platform can monitor GTP-C traffic in a mobile network and process (e.g., parse) GTP-C messages to extract mobile device identifier information (e.g., mobile device identifier information, such as IMEI, can be extracted from a Create PDP Request message in a 3G mobile network or a Create Session Request message in a 4G mobile network).

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, a security platform is configured to extract mobile device identifier information (e.g., IMEI or IMEISV) from a GTPv1-C Create PDP Request (e.g., in a 3G mobile network). In one embodiment, a security platform is configured to extract mobile device identifier information (e.g., IMEI or IMEISV) from a GTPv2-C Create Session (e.g., in a 4G mobile network).

For example, a GTPv2-C Create Session Request message can generally be sent by various network elements in a mobile network (e.g., Serving Gateway (SGW), Mobility Management Entity (MME), and/or other network elements in the mobile network) as similarly described herein with respect to FIG. 2B. Also, such a Create Session Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3GPP IP access to E-UTRAN, and/or other procedures). The IMEI Information Element (IE) is generally present in a GTPv2-C Create Session Request message as specified in 3GPP TS 29.274.

As another example, the security platform can extract mobile device identifier information (e.g., IMEI or IMEISV) from GTPv1-C Create PDP Request messages, which are generally sent from an SGSN node to a GGSN node as a part of the GPRS PDP Context Activation procedure as similarly described herein with respect to FIG. 2A.

Accordingly, the disclosed techniques for enhanced security in mobile networks for service providers include performing security in mobile networks using a security platform that can implement security policies (e.g., for users/subscribers of the mobile network) based on IMEI and Application-ID. In addition, the disclosed techniques for enhanced security in mobile networks for service providers include performing security in mobile networks using a security platform that can implement security policies (e.g., for mobile devices and/or IoT devices) based on IMEI and Application-ID.

In one embodiment, the security platform can extract mobile device identifier information (e.g., IMEI or IMEISV) to perform security based on a security policy that can be applied based on the mobile device identifier information. In one embodiment, the security platform can extract mobile device identifier information (e.g., IMEI or IMEISV) and perform DPI to identify an Application-ID to perform security based on a security policy that can be applied based on the mobile device identifier information and Application-ID.

In one embodiment, the security platform can extract mobile device identifier information (e.g., IMEI or IMEISV) and perform DPI to identify an Application-ID to perform security based on a security policy that can be applied based on the mobile device identifier information and Application-ID. For example, the security platform can perform threat detection by applying a security policy per IMEI and Application-ID in mobile and converged networks using the disclosed techniques. As another example, the security platform can perform threat prevention by applying a security policy per IMEI and Application-ID in mobile and converged networks using the disclosed techniques. As yet another example, the security platform can perform URL filtering by applying a security policy per IMEI and Application-ID in mobile and converged networks using the disclosed techniques. Example use case scenarios for enhanced security that can be performed on mobile networks for service providers using such mobile device identifier information (e.g., IMEI or IMEISV) and Application-ID are further described below (e.g., a service provider can restrict remote access to a network enabled thermostat that was determined to be compromised as further described below).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these mobile device identifier based firewall services or combinations thereof as well as various other mobile device identifier based services using the disclosed techniques. Also, mobile service providers can apply the disclosed techniques to provide such using a mobile device identifier based firewall services in combination with various other enhanced security services, such as location based, subscriber/user identity based, RAT based, and/or combinations thereof, as further described below.

These and other techniques for providing enhanced security in mobile networks for service providers based on mobile device identifier information and Application-ID (e.g., and/or other DPI and/or NGFW techniques, such as user ID, content ID, URL filtering, etc.) will be further described below.

Techniques for Mobile User Identity and/or SIM-Based IoT Identity and Application Identity Based Security Enforcement in Mobile Networks for Service Providers In one embodiment, the disclosed techniques for enhanced security in mobile networks for service providers include providing a mobile user identity and/or SIM-based IoT identity based security in mobile networks for service providers. For example, mobile service providers can apply the disclosed techniques to provide mobile user identity and/or SIM-based IoT identity based security (e.g., in combination with Application-ID using an NGFW) to user devices (e.g., mobile devices of subscribers that include a Subscriber Identity Module (SIM) card or an Embedded-SIM/Embedded Universal Integrated Circuit Card (eUICC)) that connect to their mobile network using 3G, 4G, or 5G Radio Access Technology (RAT).

In one embodiment, the disclosed techniques for enhanced security in mobile networks for service providers include providing enhanced security in mobile networks for service providers using a mobile user identity and Application-ID. For example, mobile service providers can apply the disclosed techniques to provide enhanced security to user devices (e.g., mobile devices of subscribers) and/or IoT devices that connect to their mobile network using 3G, 4G, or 5G Radio Access Technology (RAT) based on a mobile user identity and/or SIM-based IoT identity (e.g., International Mobile Subscriber Identity (IMSI) or other mobile user identifier) and Application-ID (e.g., an Application-ID can be determined by a security platform monitoring tunneled user traffic that is inspected using DPI techniques implemented by an NGFW as further described below).

In one embodiment, mobile service providers can apply the disclosed techniques to provide new and enhanced security services using a mobile user identity and/or using a mobile user identity and Application-ID. For example, mobile service providers can apply the disclosed techniques to provide a firewall service using a mobile user identity (e.g., IMSI or other mobile user identity) and Application-ID. As another example, mobile service providers can apply the disclosed techniques to provide a threat detection service using a mobile user identity and Application-ID (e.g., a mobile user identity based, basic threat detection service for known threats, a mobile user identity based, advanced threat detection service for unknown threats, and/or other threat detection services that can utilize mobile user identity based information to apply security policies). As yet another example, mobile service providers can apply the disclosed techniques to provide a threat prevention service for known threats using a mobile user identity and Application-ID (e.g., a mobile user identity based, basic threat prevention service for known threats, a mobile user identity based, advanced threat prevention service for unknown threats, and/or other threat prevention services that can utilize mobile user identity based information to apply security policies). As an additional example, mobile service providers can apply the disclosed techniques to provide a URL filtering service using a mobile user identity and Application-ID. As a further example, mobile service providers can apply the disclosed techniques to provide an application Denial of Service (DoS) detection service for DoS attacks using a mobile user identity and Application-ID. As another example, mobile service providers can apply the disclosed techniques to provide an application Denial of Service (DoS) prevention service for DoS attacks using a mobile user identity and Application-ID.

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, the disclosed techniques for enhanced security in mobile networks for service providers include performing mobile user identity and/or SIM-based IoT identity based security in mobile networks using a security platform that can implement security policies based on mobile user identity and/or SIM-based IoT identity information and Application-ID. For example, a security platform can monitor GTP-C traffic in a mobile network and process (e.g., parse) GTP-C messages to extract mobile user identity and/or SIM-based IoT identity (e.g., mobile user identifier information, such as IMSI, can be extracted from a Create PDP Request message in a 3G mobile network or a Create Session Request message in a 4G mobile network).

In one embodiment, a security platform is configured to extract mobile user identity information (e.g., IMSI) from a GTPv1-C Create PDP Request (e.g., in a 3G mobile network). In one embodiment, a security platform is configured to extract mobile user identity information (e.g., IMSI) from a GTPv2-C Create Session (e.g., in a 4G mobile network).

For example, a GTPv2-C Create Session Request message can generally be sent by various network elements in a mobile network (e.g., Serving Gateway (SGW), Mobility Management Entity (MME), and/or other network elements in the mobile network) as similarly described herein with respect to FIG. 2B. Also, such a Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3GPP IP access to E-UTRAN, and/or other procedures). The IMSI Information Element (IE) is generally present in a GTPv2-C Create Session Request message as specified in 3GPP TS 29.274.

As another example, the security platform can extract mobile user identity information (e.g., IMSI) from GTPv1-C Create PDP Request messages, which are generally sent from an SGSN node to a GGSN node as a part of the GPRS PDP Context Activation procedure as similarly described herein with respect to FIG. 2A.

Accordingly, the disclosed techniques for enhanced security in mobile networks for service providers include performing security in mobile networks using a security platform that can implement security policies (e.g., for users/subscribers of the mobile network) based on IMSI and Application-ID. In addition, the disclosed techniques for enhanced security in mobile networks for service providers include performing security in mobile networks using a security platform that can implement security policies (e.g., for mobile devices and/or IoT devices that include a SIM or embedded SIM) based on IMSI and Application-ID.

In one embodiment, the security platform can extract mobile user identity information (e.g., IMSI) to perform security based on a security policy that can be applied based on the mobile user identity information. In one embodiment, the security platform can extract mobile user identity information (e.g., IMSI) and perform DPI to identify an Application-ID to perform security based on a security policy that can be applied based on the mobile user identity information and Application-ID.

In one embodiment, the security platform can extract mobile user identity information (e.g., IMSI) and perform DPI to identify an Application-ID to perform security based on a security policy that can be applied based on the mobile user identity information and Application-ID. For example, the security platform can perform threat detection by applying a security policy per IMSI and Application-ID in mobile and converged networks using the disclosed techniques. As another example, the security platform can perform threat prevention by applying a security policy per IMSI and Application-ID in mobile and converged networks using the disclosed techniques. As yet another example, the security platform can perform URL filtering by applying a security policy per IMSI and Application-ID in mobile and converged networks using the disclosed techniques. Example use case scenarios for enhanced security that can be performed on mobile networks for service providers using such mobile user identity information (e.g., IMSI) and Application-ID are further described below (e.g., a service provider can block access to a resource, such as a device or application for the device, based on mobile user identity information as further described below).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these mobile user identity based firewall services or combinations thereof as well as various other mobile user identity based services using the disclosed techniques. Also, mobile service providers can apply the disclosed techniques to provide such using a mobile user identity based firewall services in combination with various other enhanced security services, such as location based, mobile device identifier based, RAT based, and/or combinations thereof, as further described below.

These and other techniques for providing enhanced security in mobile networks for service providers based on mobile user identity information and Application-ID (e.g., and/or other DPI and/or NGFW techniques, such as user ID, content ID, URL filtering, etc.) will be further described below.

Techniques for Radio Access Technology Based Security Enforcement in Mobile Networks for Service Providers In one embodiment, the disclosed techniques for enhanced security in mobile networks for service providers include providing a Radio Access Technology (RAT) based security in mobile networks for service providers. For example, mobile service providers can apply the disclosed techniques to provide RAT based security (e.g., in combination with Application-ID using an NGFW) to user devices that connect to their mobile network using 3G, 4G, or 5G Radio Access Technology (RAT).

In one embodiment, the disclosed techniques for enhanced security in mobile networks for service providers include providing RAT based security in mobile networks for service providers. For example, mobile service providers can apply the disclosed techniques to provide RAT based security to user devices (e.g., mobile devices of subscribers) and/or IoT devices that connect to their mobile network using 3 GPP RAT or non-3 GPP RAT.

In one embodiment, mobile service providers can apply the disclosed techniques to provide new and enhanced security services based on RAT. For example, mobile service providers can apply the disclosed techniques to provide a RAT based firewall service. As another example, mobile service providers can apply the disclosed techniques to provide a threat detection service using RAT information (e.g., a RAT based, basic threat detection service for known threats, a RAT based, advanced threat detection service for unknown threats, and/or other threat detection services that can utilize RAT based information to apply security policies). As yet another example, mobile service providers can apply the disclosed techniques to provide a threat prevention service for known threats using RAT information (e.g., a RAT based, basic threat prevention service for known threats, a RAT based, advanced threat prevention service for unknown threats, and/or other threat prevention services that can utilize RAT based information to apply security policies). As an additional example, mobile service providers can apply the disclosed techniques to provide a URL filtering service using RAT information.

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, the disclosed techniques for enhanced security in mobile networks for service providers include performing RAT based security in mobile networks using a security platform that can implement security policies based on RAT information. For example, a security platform can monitor GTP-C traffic in a mobile network and process (e.g., parse) GTP-C messages to extract RAT information.

In one embodiment, a security platform is configured to extract RAT information from a GTPv2-C Create Session (e.g., in a 4G mobile network). For example, a GTPv2-C Create Session Request message can generally be sent by various network elements in a mobile network (e.g., Serving Gateway (SGW), Mobility Management Entity (MME), and/or other network elements in the mobile network) as similarly described herein with respect to FIG. 2B. Also, such a Create Session Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3GPP IP access to E-UTRAN, and/or other procedures). The RAT Information Element (IE) is generally present in a GTPv2-C Create Session Request message as specified in 3GPP TS 29.274. For example, the RAT IE can be set to 3GPP access or to non-3GPP access that the User Equipment (UE) is using to attach to the mobile network.

In one embodiment, the disclosed techniques for enhanced security in mobile networks for service providers include performing RAT based security in mobile networks using a security platform that can implement security policies based on RAT information (e.g., RAT Types supported by GTPv2-C). Example RAT Types supported by GTPv2-C include the following: UTRAN (e.g., RAT Type value=1), GERAN (e.g., RAT Type value=2), WLAN (e.g., RAT Type value=3), GAN (e.g., RAT Type value=4), HSPA Evolution (e.g., RAT Type value=5), EUTRAN (WB-E-UTRAN) (e.g., RAT Type value=6), Virtual (e.g., RAT Type value=7), and EUTRAN-NB-IoT (e.g., RAT Type value=8).

In one embodiment, a security platform is configured to extract RAT information from a GTPv1-C Create PDP Request message (e.g., in a 3G mobile network). For example, the security platform can extract RAT information from GTPv1-C Create PDP Request messages, which are generally sent from an SGSN node to a GGSN node as a part of the GPRS PDP Context Activation procedure as similarly described herein with respect to FIG. 2A.

Accordingly, the disclosed techniques for enhanced security in mobile networks for service providers include performing security in mobile networks using a security platform that can implement security policies based on RAT information. In one embodiment, the security platform can extract RAT information to perform security based on a security policy that can be applied based on the RAT information. For example, the security platform can perform threat detection by applying a security policy per RAT Type in mobile and converged networks using the disclosed techniques. As another example, the security platform can perform threat prevention by applying a security policy per RAT Type in mobile and converged networks using the disclosed techniques. As yet another example, the security platform can perform URL filtering by applying a security policy per RAT Type in mobile and converged networks using the disclosed techniques. Example use case scenarios for enhanced security that can be performed on mobile networks for service providers using RAT information are further described below (e.g., a Tier-1 cellular/mobile service provider that leases 3G (but not 4G) cellular/mobile network access to a Tier-2 service provider can configure the disclosed security platform to utilize RAT information to allow access to their 3G network for users/subscribers to the Tier-2 cellular/mobile service provider but restrict/not allow access to their 4G network for such users/subscribers, such as further described below).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these RAT based firewall services or combinations thereof as well as various other RAT based services using the disclosed techniques. Also, mobile service providers can apply the disclosed techniques to provide such using RAT based firewall services in combination with various other enhanced security services, such as location based, mobile device identifier based, mobile user identifier based, and/or combinations thereof, as further described below.

These and other techniques for providing enhanced security for CIoT in mobile networks for service providers based on various parameters/information, such as parameters extracted from GTP traffic over the S11 interface (e.g., and/or in combination with various DPI and/or NGFW techniques, such as Application-ID, user ID, content ID, URL filtering, etc., which can be applied to 4G and 5G networks) will be further described below.

Example Use Cases of Enhanced Security for CIoT in Mobile Networks for Service Providers The disclosed techniques for providing enhanced security for CIoT in mobile/service provider networks using a security platform for security policy enforcement can be applied in a variety of additional example use case scenarios for facilitating enhanced and more flexible and dynamic security for CIoT within mobile/service provider network environments. Additional example use case scenarios will be further described below.

As a first example use case scenario, assume that mobile and converged network operators are offering wireless IoT technologies (e.g., CIoT devices) including Narrowband IoT (NB-IoT) to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this creates an opportunity for mobile and converged network operators to offer network-based security services to these customers that can be provided using the disclosed techniques for enhanced security for CIoT in mobile/service provider networks using a security platform for security policy enforcement (e.g., using inspection and security capabilities on an S11-U interface as described herein).

As a second example use case scenario, assume that mobile and converged network operators are offering wireless IoT technologies (e.g., CIoT devices) including Narrowband IoT (NB-IoT) to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this can lead to CIoT device initiated attacks on the mobile network to which they are connected. As similarly described herein, the disclosed techniques for enhanced security for CIoT in mobile/service provider networks using a security platform for security policy enforcement including inspection and security capabilities on an S11-U interface can be performed to protect the critical network elements of mobile networks from attacking CIoT devices.

Examples of IoT Threats

Example router vulnerabilities include the following: (1) TP-Link Remote Command Execution Vulnerability; (2) ZyXEL/Billion/TrueOnline Routers Remote Code Execution Vulnerability; (3) Netgear WNR2000 Remote Code Execution Vulnerability; (4) ASUS/Netcore Router Default Credential Remote Code Execution Vulnerability; and (5) Netis/Netcore Router Default Credential Remote Code Execution Vulnerability Camera vulnerability, such as the Sony IPELA ENGINE IP Cameras Backdoor Vulnerability. The above-described techniques for applying APN and Application-ID based security enforcement in service provider networks can be performed to respond to such example router vulnerabilities. As an example, for one APN, a mobile operator can define an action block (e.g., to drop and log) for all router related remote code execution vulnerabilities. For another APN, the mobile operator can choose to define an action alert (e.g., to allow and log) for all router related remote code execution vulnerabilities.

Mirai (malware) botnet attack is an example botnet attack that primarily targets online consumer devices, such as IP cameras and home routers. As an example for one APN, a mobile operator can define an action block (e.g., to drop and log) for all Mirai Command and Control traffic using anti-spyware signatures Threat ID: 13999 and 13974 https://threatvault.paloaltonetworks.com/. For another APN, the mobile operator can choose to define an action alert (e.g., to allow and log) for all Mirai Command and Control traffic.

As will now be apparent in view of the disclosed embodiments, a network service provider/mobile operator (e.g., a cellular service provider entity), a device manufacturer (e.g., an automobile entity, CIoT device entity, and/or other device manufacturer), and/or system integrators can specify such security policies that can be enforced by a security platform using the disclosed techniques to solve these and other technical network security challenges.

Figure 5:
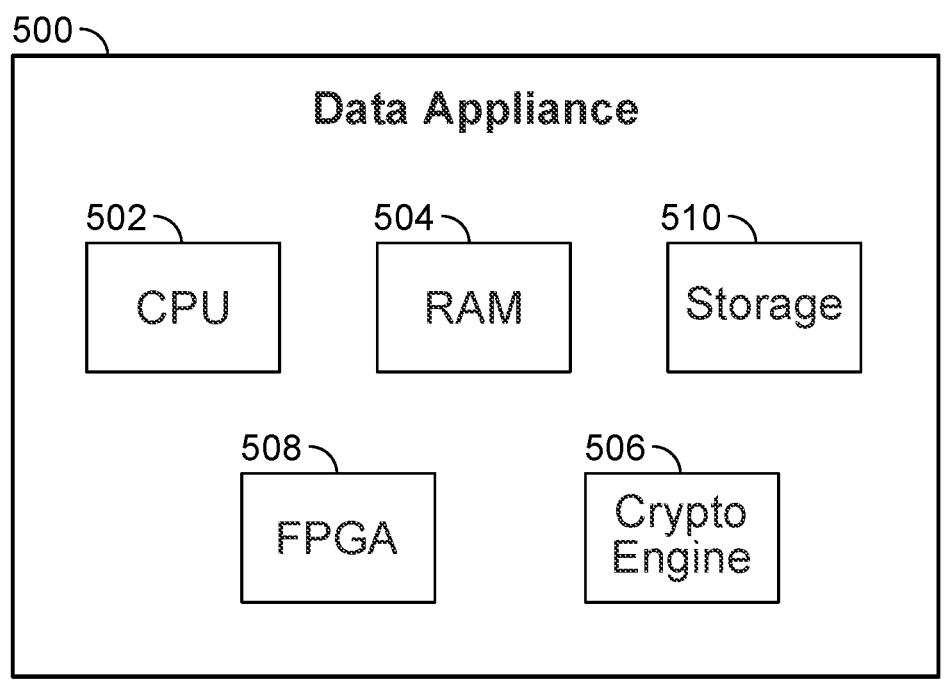
FIG. 5 is a functional diagram of hardware components of a network device for performing enhanced security for CIoT in mobile networks for service providers in accordance with some embodiments.

Example Hardware Components of a Network Device for Performing Enhanced Security for CIoT in Mobile Networks for Service Providers FIG. 5 is a functional diagram of hardware components of a network device for performing enhanced security for CIoT in mobile networks for service providers in accordance with some embodiments. The example shown is a representation of physical/hardware components that can be included in network device 500 (e.g., an appliance, gateway, or server that can implement the security platform disclosed herein). Specifically, network device 500 includes a high performance multi-core CPU 502 and RAM 504. Network device 500 also includes a storage 510 (e.g., one or more hard disks or solid state storage units), which can be used to store policy and other configuration information as well as signatures. In one embodiment, storage 510 stores location information, hardware identifier information, subscriber identity information, and/or RAT information and associated IP addresses and possibly other information (e.g., Application-ID, Content-ID, User-ID, URL, and/or other information) that are monitored for implementing the disclosed security policy enforcement techniques using a security platform/firewall device. Network device 500 can also include one or more optional hardware accelerators. For example, network device 500 can include a cryptographic engine 506 configured to perform encryption and decryption operations, and one or more FPGAs 508 configured to perform signature matching, act as network processors, and/or perform other tasks.

Figure 6:
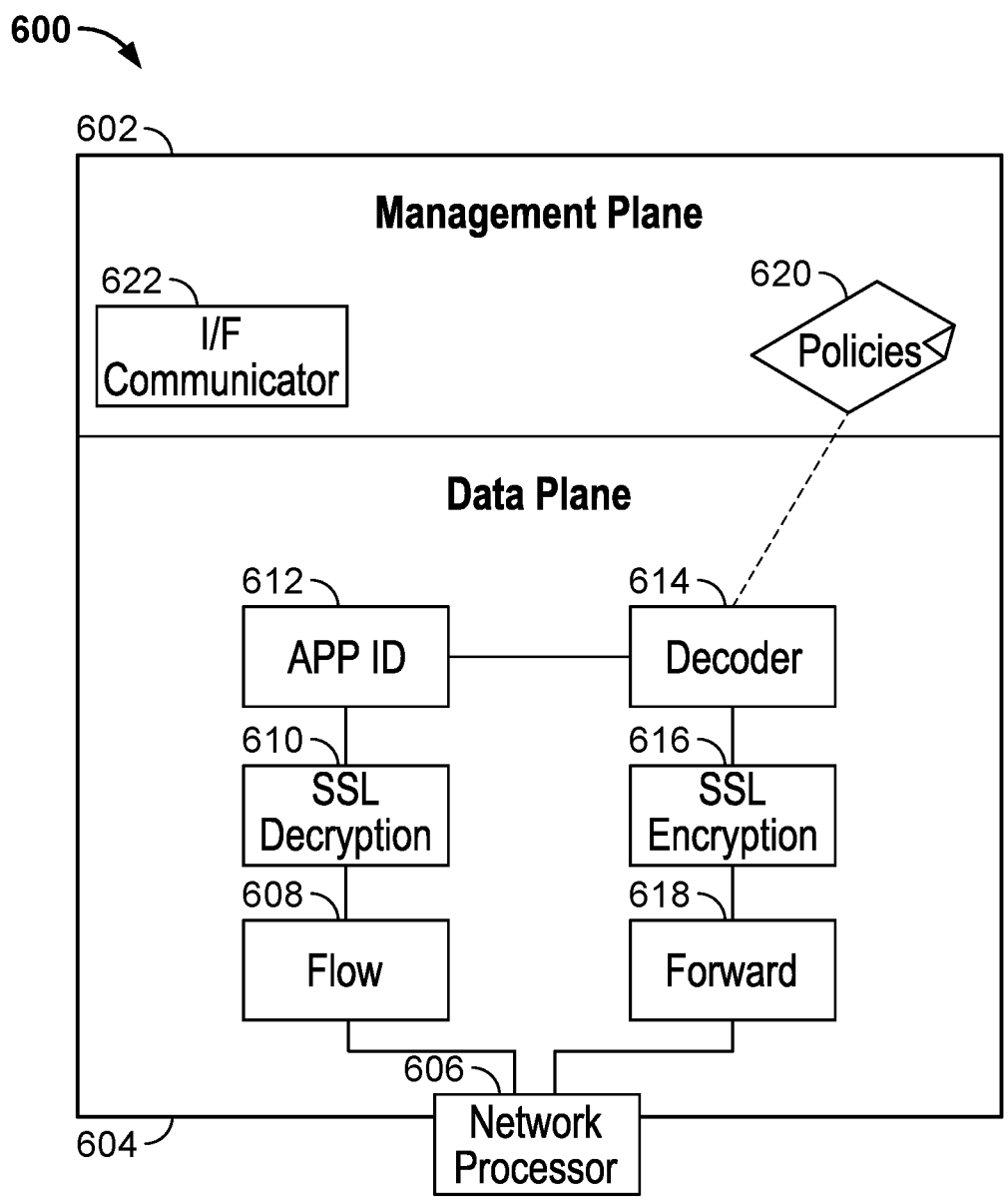
FIG. 6 is a functional diagram of logical components of a network device for performing enhanced security for CIoT in mobile networks for service providers in accordance with some embodiments.

Example Logical Components of a Network Device for Performing Enhanced Security for CIoT in Mobile Networks for Service Providers FIG. 6 is a functional diagram of logical components of a network device for performing enhanced security for CIoT in mobile networks for service providers in accordance with some embodiments. The example shown is a representation of logical components that can be included in network device 600 (e.g., a data appliance, which can implement the disclosed security platform and perform the disclosed techniques). As shown, network device 600 includes a management plane 602 and a data plane 604. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an IoT device such as a CIoT device, or another resource) using an encrypted session protocol, such as SSL. Network processor 606 is configured to monitor packets from the mobile device and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification (APP ID) module 612 is configured to determine what type of traffic the session involves and to identify a user associated with the traffic flow (e.g., to identify an Application-ID as described herein). For example, APP ID 612 can recognize a GET request in the received data and conclude that the session requires an HTTP decoder. As another example, APP ID 612 can recognize a Create Session Request or a Create PDP Request in the received data and conclude that the session requires a GTP decoder. For each type of protocol, there exists a corresponding decoder 614. In one embodiment, the application identification is performed by an application identification module (e.g., APP ID component/engine), and a user identification is performed by another component/engine. Based on the determination made by APP ID 612, the packets are sent to an appropriate decoder 614. Decoder 614 is configured to assemble packets (e.g., which may be received out of order) into the correct order, perform tokenization, and extract out information. Decoder 614 also performs signature matching to determine what should happen to the packet. SSL encryption engine 616 performs SSL encryption using various techniques as described herein and the packets are then forwarded using a forward component 618 as shown. As also shown, policies 620 are received and stored in the management plane 602. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-C messages and/or DPI of monitored GTP-U traffic as disclosed herein) is applied as described herein with respect to various embodiments based on the monitored, decrypted, identified, and decoded session traffic flows.

As also shown in FIG. 6, an interface (I/F) communicator 622 is also provided for security platform manager communications (e.g., via (REST) APIs, messages, or network protocol communications or other communication mechanisms). In some cases, network communications of other network elements on the service provider network are monitored using network device 600, and data plane 604 supports decoding of such communications (e.g., network device 600, including I/F communicator 622 and decoder 614, can be configured to monitor and/or communicate on, for example, Gn, Gp, SGi, Gi, 51, S5, S8, S11, and/or other interfaces where wired and wireless network traffic flow exists as similarly described herein). As such, network device 600 including I/F communicator 622 can be used to implement the disclosed techniques for security policy enforcement on mobile/service provider network environments as described above and as will be further described below.

Additional example processes for the disclosed techniques for performing enhanced security for CIoT on mobile/service provider network environments will now be described.

Figure 7:
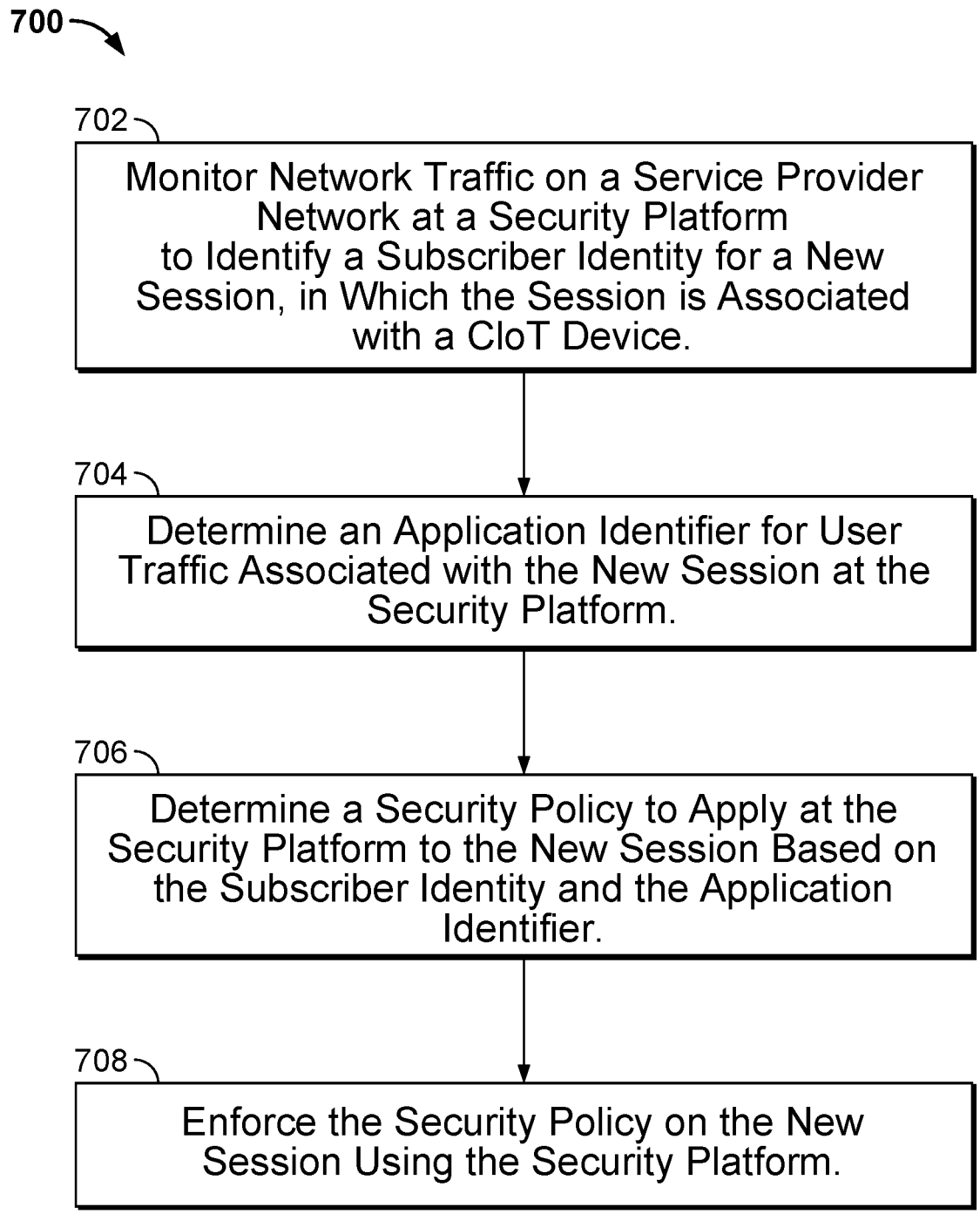
FIG. 7 is a flow diagram of a process for performing enhanced security for CIoT in mobile networks for service providers in accordance with some embodiments.

Example Processes for Enhanced Security for CIoT in Mobile Networks for Service Providers FIG. 7 is a flow diagram of a process for performing enhanced security for CIoT in mobile networks for service providers in accordance with some embodiments. In some embodiments, a process 700 as shown in FIG. 7 is performed by the security platform and techniques as similarly described above including the embodiments described above with respect to FIGS. 1A-6. In one embodiment, process 700 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 702. At 702, monitoring network traffic on a service provider network at the security platform to identify a subscriber identity and/or SIM-based IoT identity for a new session, in which the session is associated with a CIoT device, is performed. For example, the security platform (e.g., a firewall, a network sensor acting on behalf of the firewall, or another device/component that can implement security policies) can extract mobile user identity and/or SIM-based IoT identity information/parameters (e.g., IMSI) from GTP-C traffic on the mobile core network as similarly described above.

At 704, determining an application identity (e.g., application identifier) for user traffic associated with the new session at the security platform is performed. For example, an application identifier (e.g., Application-ID) can be identified by monitoring GTP-U traffic using DPI-based firewall techniques as similarly described above.

At 706, determining a security policy to apply at the security platform to the new session based on the subscriber identity and the application identifier is performed. For example, the security policy can be determined and/or enforced based on various combinations of location, hardware identifier, subscriber identity, and RAT information and/or based on information detected/determined using DPI-based firewall techniques, such as by performing URL filtering, identifying an Application-ID, identifying a Content-ID, and/or using other DPI-based firewall techniques as similarly described above.

At 708, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 8:
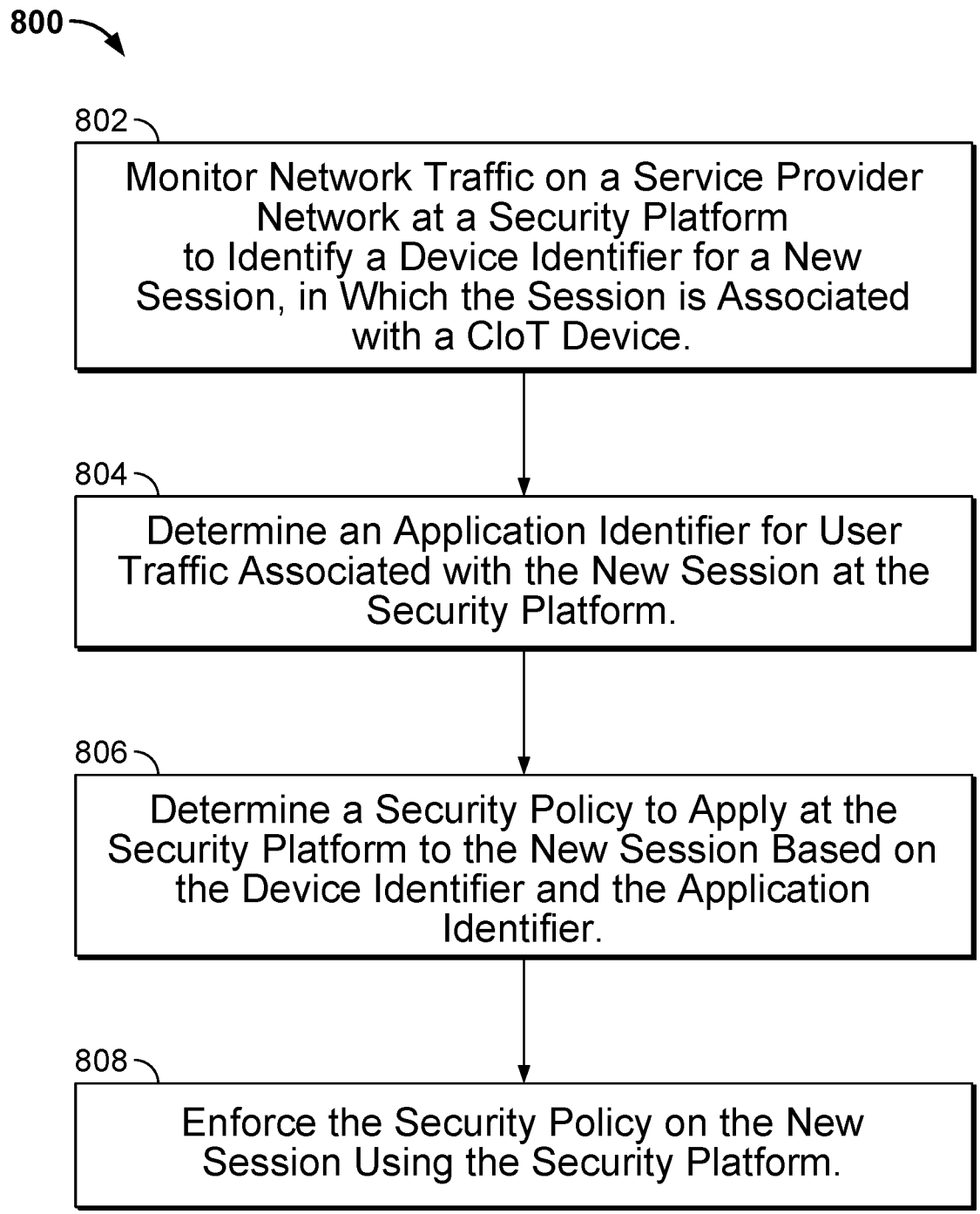
FIG. 8 is another flow diagram of a process for performing enhanced security for CIoT in mobile networks for service providers in accordance with some embodiments.

FIG. 8 is another flow diagram of a process for performing enhanced security for CIoT in mobile networks for service providers in accordance with some embodiments. In some embodiments, a process 800 as shown in FIG. 8 is performed by the security platform and techniques as similarly described above including the embodiments described above with respect to FIGS. 1A-6. In one embodiment, process 800 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 802. At 802, monitoring network traffic on a service provider network at the security platform to identify a mobile equipment identity and/or IoT equipment identity for a new session, in which the session is associated with a CIoT device, is performed. For example, the security platform (e.g., a firewall, a network sensor acting on behalf of the firewall, or another device/component that can implement security policies) can extract mobile equipment identity and/or IoT equipment identity information/parameters (e.g., IMEI) from GTP-C traffic on the mobile core network as similarly described above.

At 804, determining an application identity (e.g., application identifier) for user traffic associated with the new session at the security platform is performed. For example, an application identifier (e.g., Application-ID) can be identified by monitoring GTP-U traffic using DPI-based firewall techniques as similarly described above.

At 806, determining a security policy to apply at the security platform to the new session based on the mobile equipment identity and/or IoT equipment identity and application identity is performed. For example, the security policy can be determined and/or enforced based on various combinations of location, hardware identifier, subscriber identity, and RAT information and/or based on information detected/determined using DPI-based firewall techniques, such as by performing URL filtering, identifying an Application-ID, identifying a Content-ID, and/or using other DPI-based firewall techniques as similarly described above.

At 808, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

As will now be apparent in view of the disclosed embodiments, a network service provider/mobile operator (e.g., a cellular service provider entity), a device manufacturer (e.g., an automobile entity, IoT device entity, and/or other device manufacturer), and/or system integrators can specify such security policies that can be enforced by a security platform using the disclosed techniques to solve these and other technical network security challenges.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a hardware processor configured to:
monitor network traffic on a service provider network at a security platform to identify a subscriber identity for a new session, wherein the new session is associated with a Cellular Internet of Things (CIoT) device, comprising:
extract a unique device identifier or a unique subscriber identifier from a message to associate with the subscriber identity, wherein the message is a create Packet Data Protocol (PDP) request message or a create session request message to create the new session, wherein the unique device identifier includes an International Mobile Equipment Identifier (IMEI), and wherein the unique subscriber identifier includes an International Mobile Subscriber Identity (IMSI);
determine an application identifier for user traffic associated with the new session at the security platform, comprising:
monitor, via deep packet inspection, tunneled user traffic to obtain the application identifier;
associate the application identifier with the unique device identifier or the unique subscriber identifier; and
apply a security policy at the security platform to the new session based on the application identifier and the associated unique device identifier or the unique subscriber identifier, wherein the security policy includes one or more security rules for threat detection, threat prevention, Uniform Resource Location (URL) filtering, Denial of Service (DoS) detection, and/or Denial of Service (DoS) prevention; and
a memory coupled to the hardware processor and configured to provide the hardware processor with instructions.

2. The system recited in claim 1, wherein the security platform is configured with a plurality of security policies based on the subscriber identity and the application identifier, and wherein the subscriber identity includes an International Mobile Subscriber Identity (IMSI).

3. The system recited in claim 1, wherein the security platform is configured with a plurality of security policies based on the subscriber identity, the unique device identifier, and the application identifier, wherein the subscriber identity includes an International Mobile Subscriber Identity (IMSI), and wherein the unique device identifier includes an International Mobile Equipment Identifier (IMEI).

4. The system recited in claim 1, wherein the security platform monitors wireless interfaces including a plurality of interfaces for a control protocol and user data traffic in a mobile core network for a 4G and/or 5G network.

5. The system recited in claim 1, wherein the security platform monitors wireless interfaces including a plurality of interfaces for a GPRS Tunneling Protocol (GTP) in a mobile core network for a 4G and/or 5G network, including an S11 interface.

6. The system recited in claim 1, wherein the security platform is configured with a plurality of security policies based on the subscriber identity and the application identifier.

7. The system recited in claim 1, wherein the security platform is configured to perform security policy enforcement for CIoT.

8. The system recited in claim 1, wherein the security platform is configured to perform threat detection for known threats for CIoT.

9. The system recited in claim 1, wherein the security platform is configured to perform advanced threat detection for unknown threats for CIoT.

10. The system recited in claim 1, wherein the security platform is configured to perform Uniform Resource Link (URL) filtering for CIoT.

11. The system recited in claim 1, wherein the security platform is configured to perform application Denial of Service (DoS) detection for CIoT.

12. The system recited in claim 1, wherein the security platform is configured to perform application Denial of Service (DoS) prevention for CIoT.

13. The system recited in claim 1, wherein the hardware processor is further configured to:
block the new session from accessing a resource based on the security policy.

14. A method, comprising:
monitoring network traffic on a service provider network at a security platform to identify a subscriber identity for a new session, wherein the new session is associated with a Cellular Internet of Things (CIoT) device, comprising:
extracting a unique device identifier or a unique subscriber identifier from a message to associate with the subscriber identity, wherein the message is a create Packet Data Protocol (PDP) request message or a create session request message to create the new session, wherein the unique device identifier includes an International Mobile Equipment Identifier (IMEI), and wherein the unique subscriber identifier includes an International Mobile Subscriber Identity (IMSI);
determining an application identifier for user traffic associated with the new session at the security platform, comprising:
monitoring, via deep packet inspection, tunneled user traffic to obtain the application identifier;
associating the application identifier with the unique device identifier or the unique subscriber identifier; and
apply a security policy at the security platform to the new session based on the application identifier and the associated unique device identifier or the unique subscriber identifier, wherein the security policy includes one or more security rules for threat detection, threat prevention, Uniform Resource Location (URL) filtering, Denial of Service (DoS) detection, and/or Denial of Service (DoS) prevention.

15. The method of claim 14, wherein the security platform is configured with a plurality of security policies based on the subscriber identity and the application identifier, and wherein the subscriber identity includes an International Mobile Subscriber Identity (IMSI).

16. The method of claim 14, wherein the security platform is configured with a plurality of security policies based on the subscriber identity, the unique device identifier, and the application identifier, wherein the subscriber identity includes an International Mobile Subscriber Identity (IMSI), and wherein the unique device identifier includes an International Mobile Equipment Identifier (IMEI).

17. The method of claim 14, wherein the security platform monitors wireless interfaces including a plurality of interfaces for a control protocol and user data traffic in a mobile core network for a 4G and/or 5G network.

18. The method of claim 14, wherein the security platform monitors wireless interfaces including a plurality of interfaces for a GPRS Tunneling Protocol (GTP) in a mobile core network for a 4G and/or 5G network, including an S11 interface.

19. The method of claim 14, further comprising:
blocking the new session from accessing a resource based on the security policy.

20. A computer program product, the computer program product being embodied in a tangible non-transitory computer readable storage medium and comprising computer instructions for:
monitoring network traffic on a service provider network at a security platform to identify a subscriber identity for a new session, wherein the new session is associated with a Cellular Internet of Things (CIoT) device, comprising:
extracting a unique device identifier or a unique subscriber identifier from a message to associate with the subscriber identity, wherein the message is a create Packet Data Protocol (PDP) request message or a create session request message to create the new session, wherein the unique device identifier includes an International Mobile Equipment Identifier (IMEI), and wherein the unique subscriber identifier includes an International Mobile Subscriber Identity (IMSI);
determining an application identifier for user traffic associated with the new session at the security platform, comprising:
monitoring, via deep packet inspection, tunneled user traffic to obtain the application identifier;
associating the application identifier with the unique device identifier or the unique subscriber identifier; and
apply a security policy at the security platform to the new session based on the application identifier and the associated unique device identifier or the unique subscriber identifier, wherein the security policy includes one or more security rules for threat detection, threat prevention, Uniform Resource Location (URL) filtering, Denial of Service (DoS) detection, and/or Denial of Service (DoS) prevention.

* * * * *